(12) United States Patent
Mori et al.

(10) Patent No.: US 12,271,138 B2
(45) Date of Patent: Apr. 8, 2025

(54) IMAGE FORMING APPARATUS

(71) Applicant: CANON KABUSHIKI KAISHA, Tokyo (JP)

(72) Inventors: Atsunobu Mori, Shizuoka (JP); Yohei Suzuki, Shizuoka (JP); Seiji Hara, Shizuoka (JP); Yasuhisa Matsumoto, Shizuoka (JP); Junya Azami, Shizuoka (JP); Masafumi Monde, Kanagawa (JP); Hirotaka Shiomichi, Kanagawa (JP); Tatsuya Hotogi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/319,309

(22) Filed: May 17, 2023

(65) Prior Publication Data

US 2023/0288861 A1   Sep. 14, 2023

Related U.S. Application Data

(63) Continuation of application No. 17/836,512, filed on Jun. 9, 2022, now Pat. No. 11,693,347, which is a
(Continued)

(30) Foreign Application Priority Data

Apr. 2, 2020 (JP) .................................. 2020-066952
Mar. 1, 2021 (JP) .................................. 2021-032040

(51) Int. Cl.
*G03G 15/00* (2006.01)
*H04N 1/00* (2006.01)

(52) U.S. Cl.
CPC ......... *G03G 15/55* (2013.01); *G03G 15/5029* (2013.01); *H04N 1/00029* (2013.01);
(Continued)

(58) Field of Classification Search
CPC .............. G03G 15/55; G03G 15/5029; G03G 2215/00738; G03G 2215/00742; H04N 1/00029; H04N 1/00042; H04N 1/00079
See application file for complete search history.

(56) References Cited

U.S. PATENT DOCUMENTS 5,138,178 A    8/1992  Wong
11,385,587 B2*  7/2022  Mori .................. H04N 1/00079
(Continued)

FOREIGN PATENT DOCUMENTS

CN           1932754 A      3/2007
CN         109218550 A      1/2019
(Continued)

*Primary Examiner* — Carla J Therrien
(74) *Attorney, Agent, or Firm* — Canon U.S.A., Inc. IP Division

(57) ABSTRACT

An image forming apparatus includes a first detector detecting an operation sound based on a sound wave received by a receiver; a second detector detecting basis weight of recording material based on an ultrasonic wave transmitted from a transmitter and received by the receiver; a switching unit that switches destination of a reception signal from the receiver between a first path to the first detector and a second path to the second detector; and a controller that controls the switching unit such that the reception signal is output to the first path at a first timing and to the second path at a second timing. When a predetermined condition is satisfied, the controller controls the switching unit such that the reception signal is output to the second path at the first timing or to the first path at the second timing.

7 Claims, 19 Drawing Sheets

Related U.S. Application Data continuation of application No. 17/213,046, filed on Mar. 25, 2021, now Pat. No. 11,385,587.

(52) U.S. Cl.
CPC ..... *H04N 1/00042* (2013.01); *H04N 1/00079* (2013.01); *G03G 2215/00637* (2013.01)

(56) References Cited

U.S. PATENT DOCUMENTS

| | | | | |
|---|---|---|---|---|
| 11,693,347 B2* | 7/2023 | Mori | .................. | G03G 15/5029 399/9 |
| 2013/0148990 A1* | 6/2013 | Kuramochi | .............. | B65H 7/02 399/45 |
| 2014/0054850 A1* | 2/2014 | Umi | ....................... | B65H 5/062 271/264 |
| 2014/0054851 A1* | 2/2014 | Morikawa | .............. | B65H 5/062 271/264 |
| 2014/0062008 A1* | 3/2014 | Hongo | .................... | B65H 7/02 271/258.01 |
| 2014/0077446 A1* | 3/2014 | Hongo | ..................... | B65H 5/00 73/645 |
| 2014/0077447 A1* | 3/2014 | Hongo | ................... | G03G 15/70 271/264 |
| 2014/0077448 A1* | 3/2014 | Umi | ....................... | G03G 15/70 271/264 |
| 2015/0323892 A1* | 11/2015 | Sakamaki | .......... | G03G 15/2017 399/327 |
| 2016/0109843 A1* | 4/2016 | Link | ...................... | B65H 5/062 399/21 |
| 2018/0373469 A1* | 12/2018 | Soriano | .................... | B65H 7/02 |
| 2019/0253564 A1 | 8/2019 | Koyanagi | | |
| 2019/0265607 A1 | 8/2019 | Ishimoto | | |
| 2020/0310318 A1* | 10/2020 | Suzuki | ............... | G03G 15/5029 |
| 2021/0061601 A1* | 3/2021 | Higashi | ................. | B65H 7/125 |
| 2021/0132535 A1* | 5/2021 | Suzuki | ................ | G03G 15/553 |

FOREIGN PATENT DOCUMENTS

| | | |
|---|---|---|
| CN | 110501883 A | 11/2019 |
| JP | 2019182580 A | 10/2019 |
| WO | 2018088378 A1 | 5/2018 |

* cited by examiner

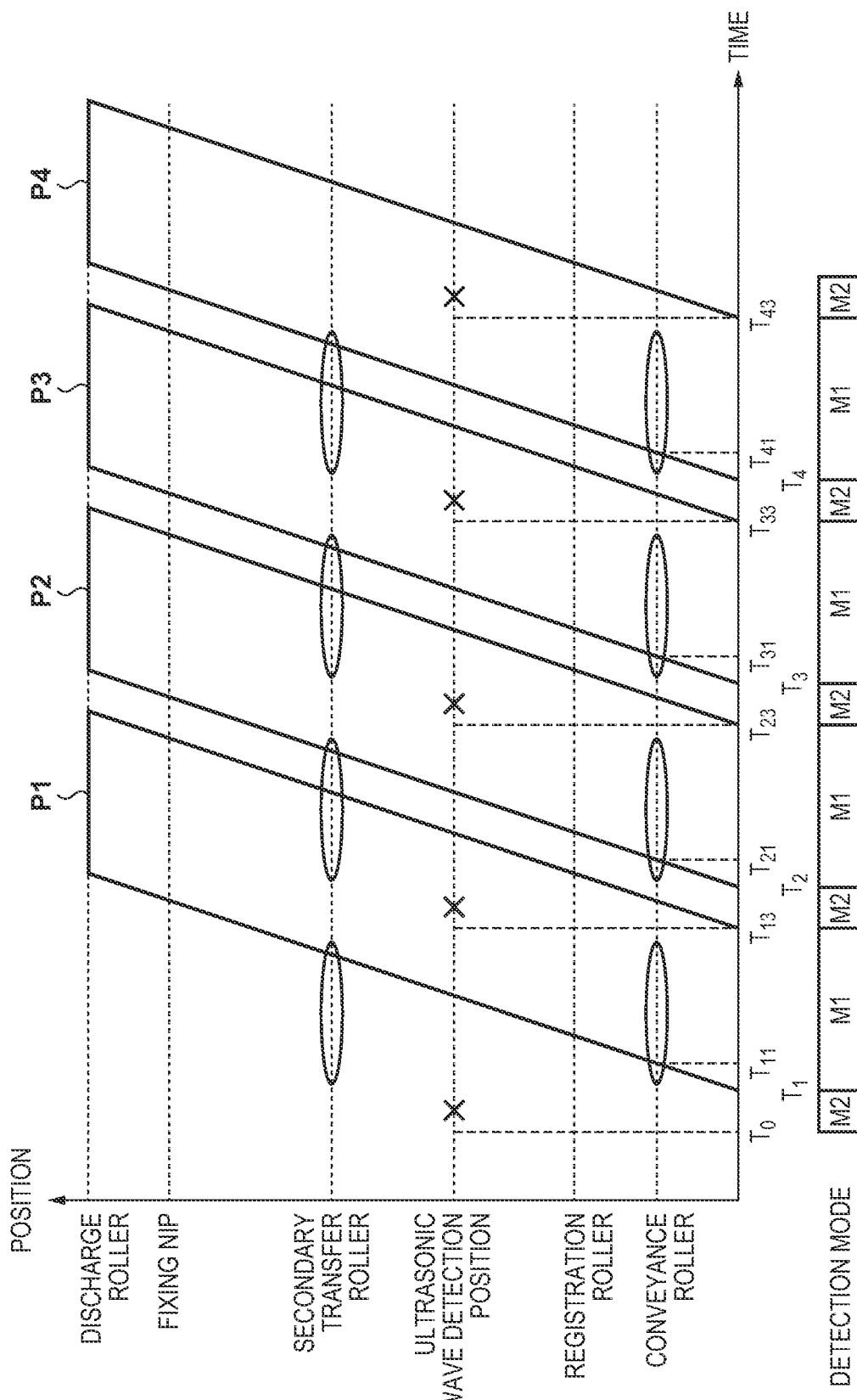

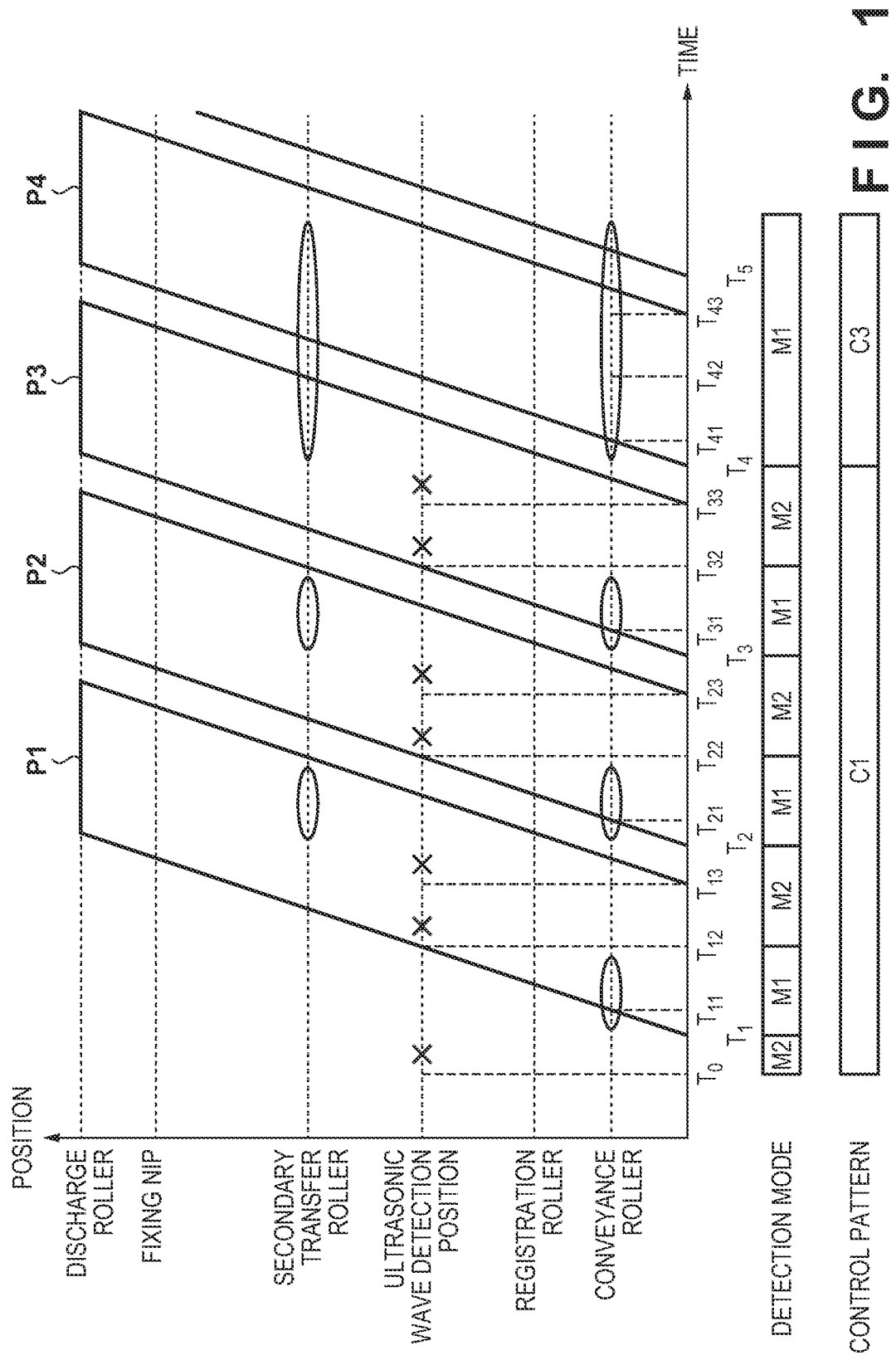

IMAGE FORMING APPARATUS

CROSS REFERENCE TO RELATED APPLICATIONS

The present application is a continuation of U.S. patent application Ser. No. 17/836,512, filed on Jun. 9, 2022, which is a continuation of U.S. patent application Ser. No. 17/213, 046, filed on Mar. 25, 2021, now issued as U.S. Pat. No. 11,385,587 on Jul. 12, 2022, which claims priority from Japanese Patent Application No. 2020-066952, filed Apr. 2, 2020, and Japanese Patent Application No. 2021-032040, filed Mar. 1, 2021, each of which are hereby incorporated by reference herein in their entirety.

BACKGROUND

Field of the Invention

The present disclosure relates to an image forming apparatus.

Description of the Related Art

A known image forming apparatus is equipped with a function for automatically determining the type of recording material. In image forming operations, by setting an operation condition suited to the determined type of recording material, the power consumption of the operation can be reduced and the image quality can be improved. With an operation condition suited to the type of recording material being automatically set, the burden on the user to perform setting is reduced. In Japanese Patent Laid-Open No. 2009-29622, technology is described that irradiates a recording material with ultrasonic wave, detects the basis weight (mass per unit area) of the recording material on the basis of the transmittance of the ultrasonic waves through the recording material, and determines the type of recording material from the detected basis weight.

A method is also known that automatically detects an operation sound that arises in the image forming apparatus and uses the detected operation sound to diagnose abnormalities. In Japanese Patent Laid-Open No. H07-302019, a management system for managing in a centralized manner a plurality of image forming apparatuses is described, with the management system determining which apparatus an abnormality has arisen in by comparing the sounds that arise in the apparatuses to a normal operation sound.

SUMMARY

Equipping a single apparatus with functions for both recording material type determination and abnormality diagnosis may lead to disadvantages, such as the size of the apparatus being increased, the number of parts being increased, and the cost being increased. To avoid such disadvantages, a configuration could be employed that shares a single reception unit (for example, a microphone) to receive sound waves and ultrasonic waves. However, in a configuration that shares the reception unit, performing the basis weight detection and the operation sound detection at the same time is problematic, and it is important to appropriately control the detection timings.

There is a demand for a system that appropriately controls the timing of the basis weight detection and the operation sound detection.

According to an aspect, there is provided an image forming apparatus that forms an image on a recording material, including: a transmission unit configured to transmit an ultrasonic wave toward a conveyance path along which the recording material is conveyed; a reception unit disposed at a position opposite to the transmission unit with respect to the conveyance path, and configured to receive a sound wave or the ultrasonic wave; a first detection unit configured to detect an operation sound that arises in the image forming apparatus on the basis of the sound wave received by the reception unit; a second detection unit configured to detect basis weight of the recording material on the basis of the ultrasonic wave received by the reception unit; a switching unit configured to switch an output destination of a reception signal from the reception unit between a first path to the first detection unit and a second path to the second detection unit; and a control unit configured to control the switching unit such that the reception signal is output to the first path at a first timing for the first detection unit to detect the operation sound, and the reception signal is output to the second path at a second timing for the second detection unit to detect the basis weight, the second timing being different from the first timing. The control unit is configured to control the switching unit such that, in a case where a predetermined condition is satisfied, the reception signal is output to the second path at the first timing or the reception signal is output to the first path at the second timing.

Further features of the present invention will become apparent from the following description of exemplary embodiments (with reference to the attached drawings).

BRIEF DESCRIPTION OF THE DRAWINGS

FIG. 8 is a timing chart illustrating a second control pattern for switching between the basis weight detection mode and the operation sound detection mode.

FIG. 10 is a timing chart illustrating an example of the detection mode transition in a case where the control pattern is changed.

DESCRIPTION OF THE EMBODIMENTS

Figure 1:
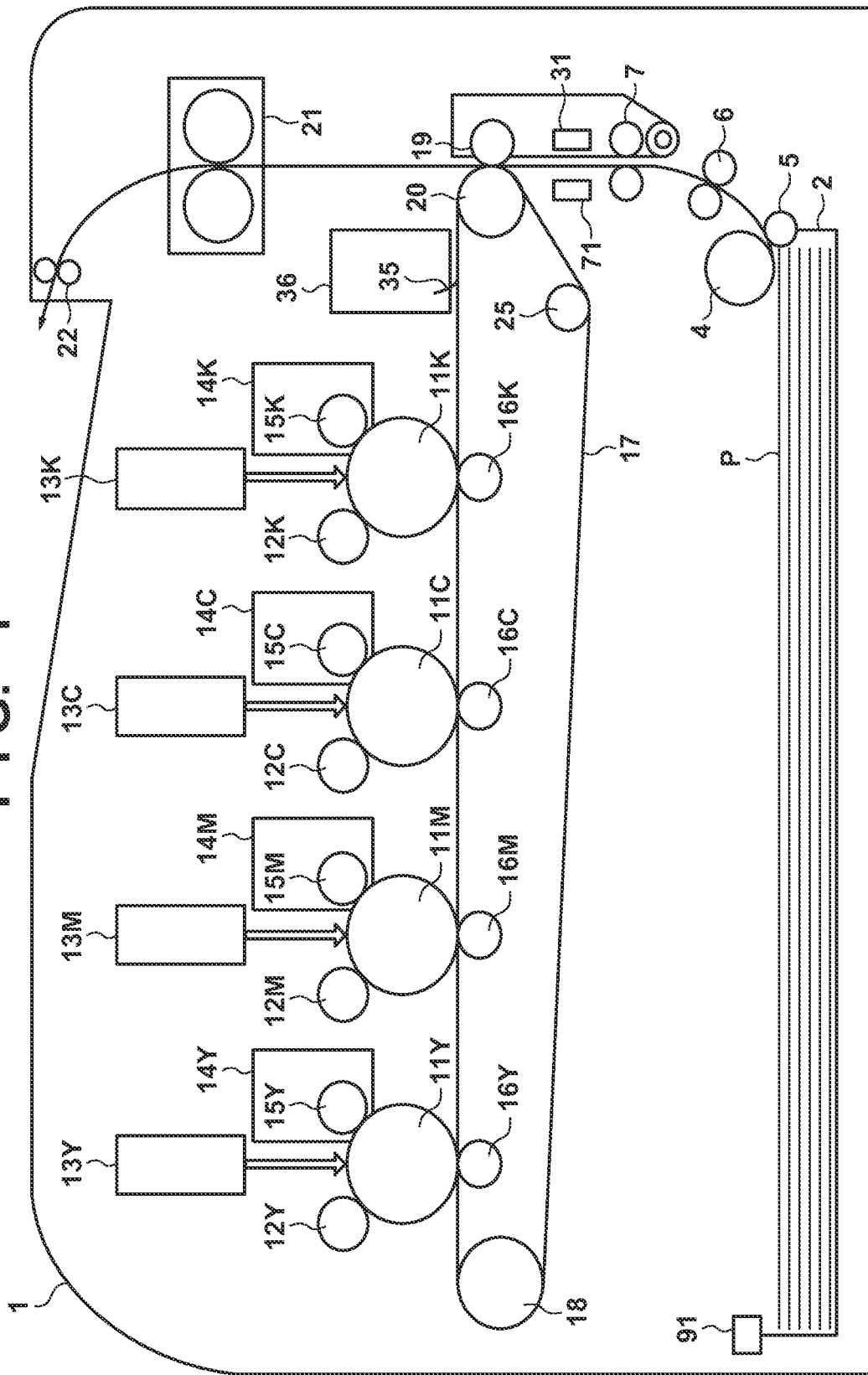
FIG. 1 is a configuration diagram illustrating an example of a configuration of an image forming unit according to one or more aspects of the present disclosure.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. General Configuration

In the present section, an example of the technology according to the present disclosure applied to a printer is mainly described. However, the technology according to the present disclosure is not limited to being applied to a printer and is broadly applicable to any image forming apparatus (for example, a copy machine, a facsimile machine, or a multi-function peripheral). If not specified, the constituent elements described below, such as apparatuses, devices, modules, and chips, may be constituted by a single entity or may be constituted by a plurality of physically different entities.

FIG. 1 is a configuration diagram illustrating an example of a configuration of an image forming unit 1 according to an embodiment. In FIG. 1, Y, M, C, and K affixed to the end of the reference signs indicate the color, respectively, yellow, magenta, cyan, and black, of the toner associated with the corresponding member. However, when the color is not required to be distinguished in the following description, the reference sign is used without the affixed letter. A photosensitive member 11, i.e., an image carrier, is rotationally driven in the clockwise direction of the drawing when forming an image. A charging roller 12 charges the surface of the photosensitive member 11 to a predetermined electric potential. An optical unit 13 forms an electrostatic latent image on the photosensitive member 11 by exposing the photosensitive member 11 to light. A developing device 14 includes a developer and develops the electrostatic latent image on the photosensitive member 11 via a developing roller 15 to form a developer image (image). A primary transfer roller 16 outputs a primary transfer bias, transfers the electrostatic latent image on the photosensitive member 11 to an intermediate transfer belt 17, i.e., an image carrier, and forms a developer image on the intermediate transfer belt 17. Note that by transferring the developer images formed by the photosensitive members 11Y, 11M, 11C, and 11K on top of each other on the intermediate transfer belt 17, a full color developer image can be formed on the intermediate transfer belt 17.

The intermediate transfer belt 17 is mounted at tension around a driving roller 18, a tension roller 25, and a secondary transfer opposing roller 20 and, when forming an image, is rotationally driven in the anticlockwise direction in the diagram by the rotation of the driving roller 18. Accordingly, the developer image transferred to the intermediate transfer belt 17 is conveyed to an opposing position of a secondary transfer roller 19. Also, a cassette 2 is a retaining unit for accumulating and retaining the recording material P prior to conveyance. The recording material P (also referred to as a sheet) retained in the cassette 2 is feed to the conveyance path by a feeding roller 4. A separation roller 5 separates the recording material P one sheet at a time when the recording material P is feed from the cassette 2. The feeding roller 4 and the separation roller 5 constituted a feeding unit. While a non-illustrated electromagnetic clutch is in an ON-state, rotational driving force from a non-illustrated motor is transferred to the feeding roller 4, and this rotationally drives the feeding roller 4. While the electromagnetic clutch is in the OFF-state, the transfer of rotational driving force from the non-illustrated motor to the feeding roller 4 is interrupted. A pair of conveyance rollers 6 convey a feed recording material P downstream of the conveyance path, through a pair of registration rollers 7, toward the opposing position of the secondary transfer roller 19. The secondary transfer roller 19 transfers the developer image of the intermediate transfer belt 17 to the recording material P by outputting a secondary transfer bias. Note that the developer remaining on the intermediate transfer belt 17 not transferred to the recording material P is collected in a cleaning unit 36 by a cleaning blade 35. After the developer image is transferred, the recording material P is conveyed to a fixing device 21. The fixing device 21 applies heat and pressure to the recording material P to fix the developer image to the recording material P. After the developer image is fixed, the recording material P is discharged to a discharge tray by a pair of discharge rollers 22. Note that each of pairs of rollers including the pair of conveyance rollers 6 and the pair of discharge rollers 22 constitutes a roller unit.

The image forming unit 1 includes a transmission unit 31 that transmits ultrasonic waves toward the conveyance path along which the recording material P is conveyed. The transmission unit 31 is disposed close to the conveyance path (in the example of FIG. 1, the transmission unit 31 is disposed upstream from the secondary transfer roller 19 in the conveyance direction). The image forming unit 1 further includes a reception unit 71 that receives sound waves or ultrasonic waves. Herein, sound waves may include a frequency component in the audible range and may include a frequency component in the inaudible range (for example, ultrasonic waves). The reception unit 71 is disposed at a position opposite the transmission unit 31 on the other side of the conveyance path. Thus, the ultrasonic waves transmitted by the transmission unit 31 pass through the conveyance path and are received by the reception unit 71. For example, the transmission unit 31 includes a piezoelectric element (also referred to as a piezo element) which is a mutual conversion element that converts mechanical displacement to electrical signal or vice versa. The reception unit 71 includes a micro-electromechanical system (MEMS) microphone that converts a vibration displacement of a vibration plate caused by pressure into a change in voltage and outputs this. Note that a reception unit other than a MEMS microphone, such as a condenser microphone for example, may also be used as long as the reception unit is capable of receiving both ultrasonic waves and sound waves in the audible range.

As illustrated in FIG. 1, the image forming unit 1 further includes a cassette sensor 91. The cassette sensor 91 detects user operations including the cassette 2 being pulled out from the device body and the cassette 2 being inserted into the body. The cassette sensor 91 outputs a sensor signal indicative of the detection result of the user operation to a central processing unit (CPU) 207 described below. The user can pull the cassette 2 out from the body of the device, place recording material in the cassette 2 or replace the recording material housed in the cassette 2 with a different type of recording material, for example.

Figure 2:
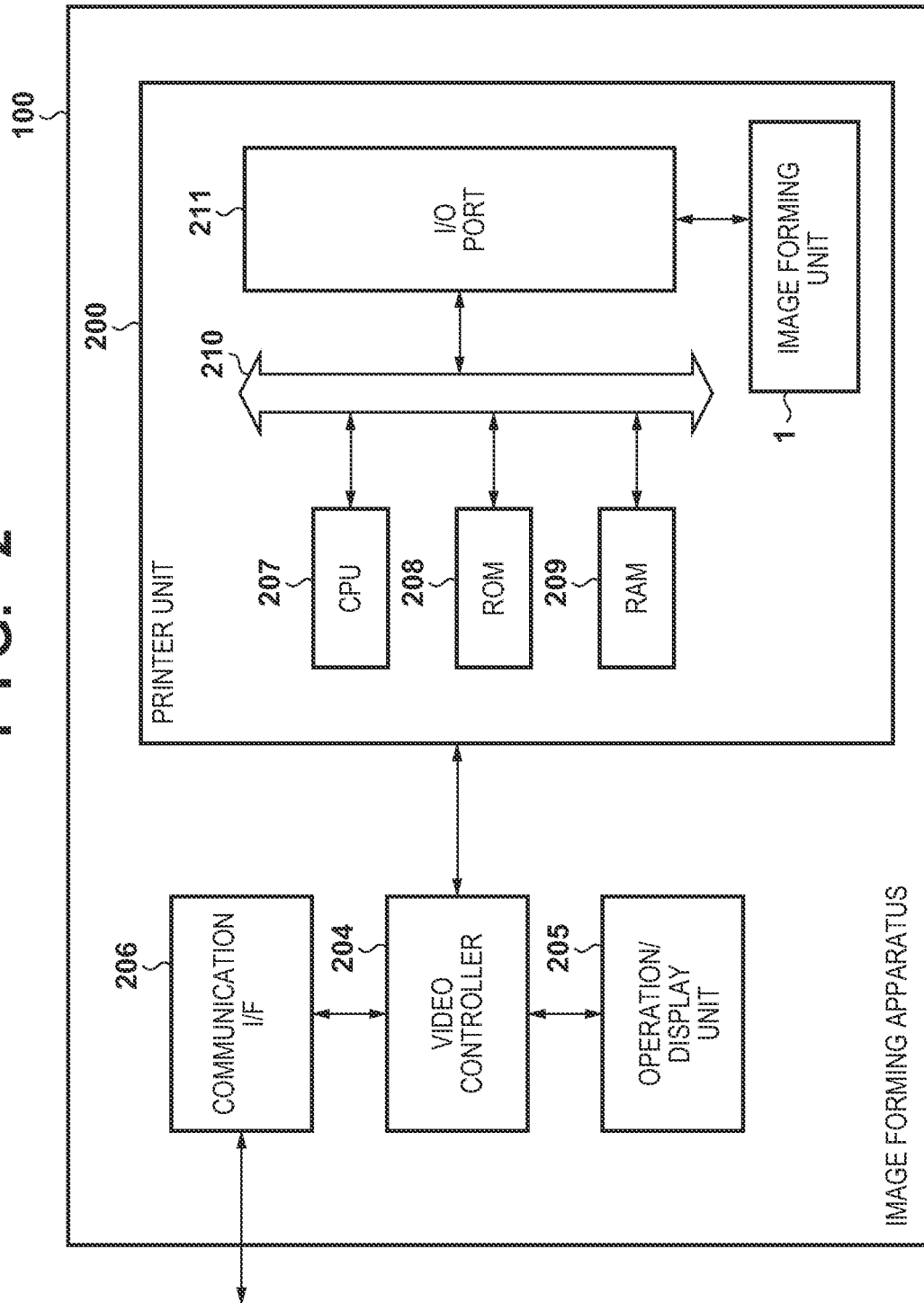
FIG. 2 is a block diagram illustrating an example of a configuration of an image forming apparatus according to one or more aspects of the present disclosure.

FIG. 2 is a block diagram illustrating an example of the configuration of an image forming apparatus 100 according to the present embodiment. Referring to FIG. 2, the image forming apparatus 100 is provided with a printer unit 200, a video controller 204, an operation/display unit 205, and a communication interface (I/F) 206. The printer unit 200 includes the image forming unit 1, the CPU 207, read-only memory (ROM) 208, random access memory (RAM) 209, a system bus 210, and an input/output (I/O) port 211. The video controller 204 acquires information indicative of the state of the image forming unit 1 from the printer unit 200 and controls the screen display by the operation/display unit 205 on the basis of the acquired information. Also, the video controller 204 receives a print job from an external host computer (not illustrated) via the communication I/F 206 and outputs the print job together with the print image data to the printer unit 200. The operation/display unit 205 includes an operation unit (for example, an operation panel or an operation button (not illustrated) for receiving a user operation and a display unit that displays the information. The operation/display unit 205, for example, displays on the screen the information indicative of the state of the image forming unit 1 under the control of the video controller 204. The communication I/F 206 is an interface for communication by the image forming apparatus 100 with other devices. The communication I/F 206 may be a wired communication I/F or may be a wireless communication I/F. The CPU 207 is a processor that controls all of the functions of the image forming apparatus 100. ROM 208 is a non-volatile memory that stores data and programs to be executed by the CPU 207. The RAM 209 is a volatile memory that provides a temporary storage area for work to the CPU 207. The CPU 207 implements the various control functions of the image forming apparatus 100 described below by loading a computer program stored in the ROM 208 on the RAM 209 and executing the computer program, for example. The system bus 210 is a signal line connecting together the CPU 207, the ROM 208, the RAM 209, and the I/O port 211. The I/O port 211 is an assembly of ports for connecting various actuators and sensors of the image forming unit 1 described using FIG. 1 to the printer unit 200. The CPU 207 controls conveying the recording material P and forming an image on the recording material P in the image forming unit 1 via the I/O port 211.

2. Example Functional Configuration

Figure 3:
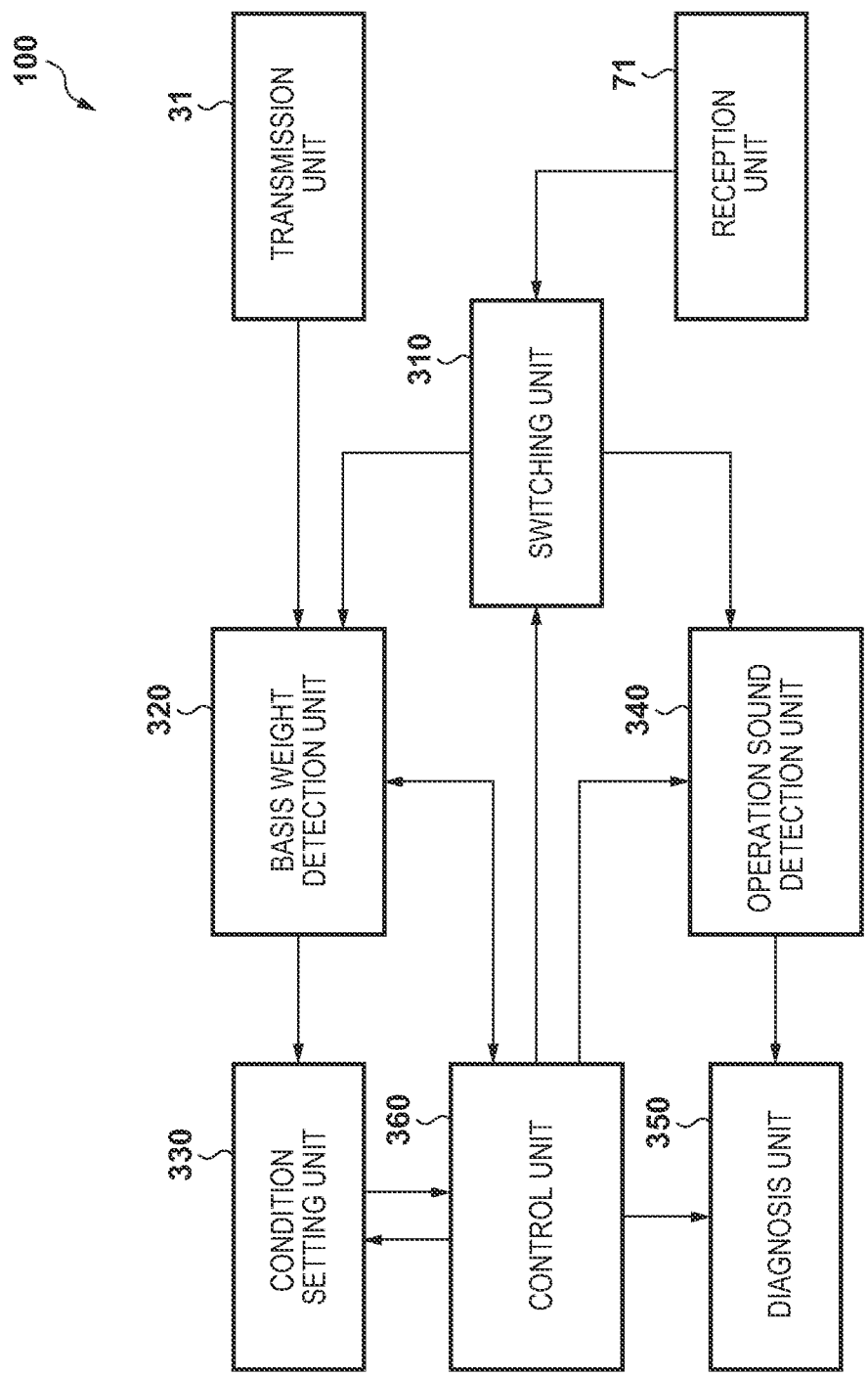
FIG. 3 is a block diagram illustrating an example of a functional configuration of an image forming apparatus according to one or more aspects of the present disclosure.

FIG. 3 is a block diagram illustrating an example of the functional configuration of the image forming apparatus 100 according to the present embodiment. Referring to FIG. 3, the image forming apparatus 100 is provided with the transmission unit 31, the reception unit 71, a switching unit 310, a basis weight detection unit 320, a condition setting unit 330, an operation sound detection unit 340, a diagnosis unit 350, and a control unit 360.

2.1 Switching Unit

Figure 4:
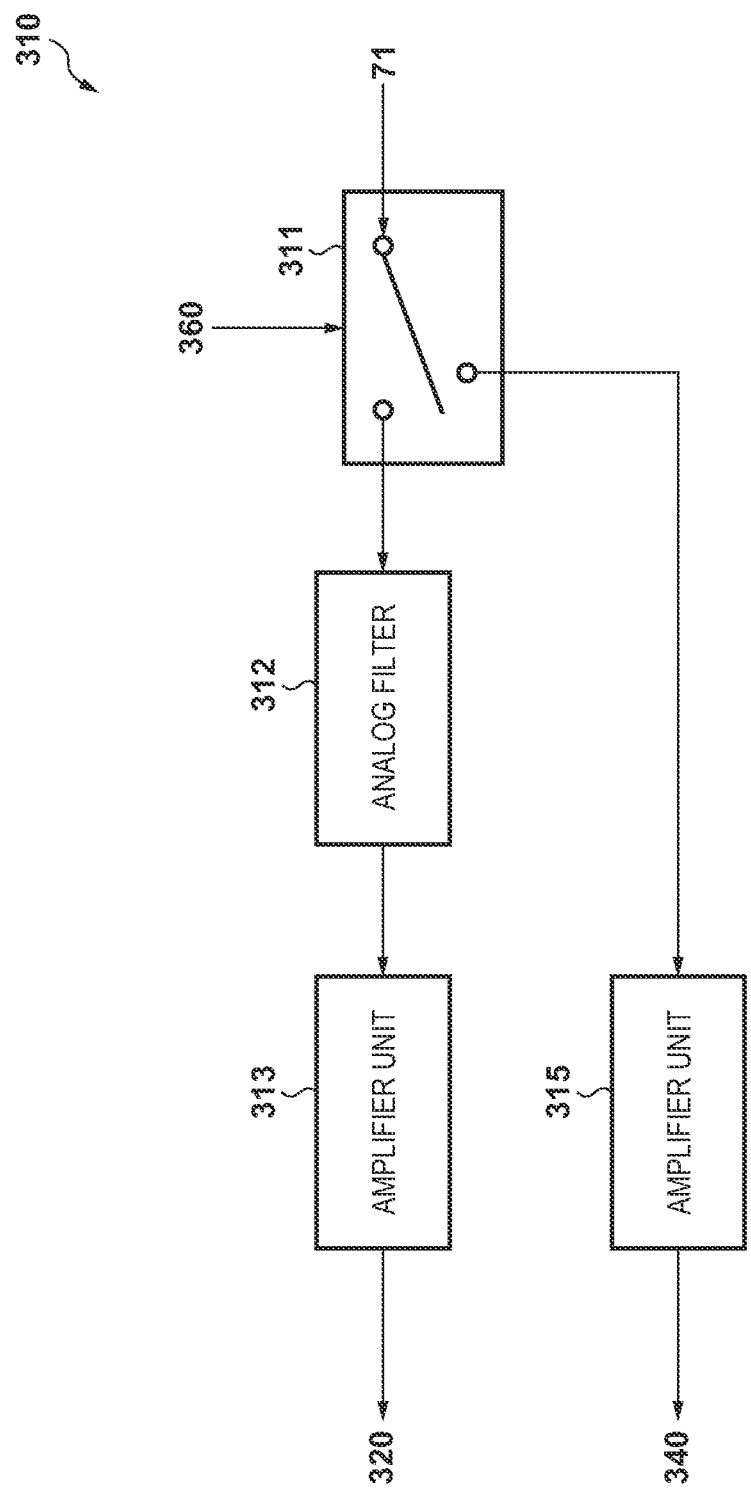
FIG. 4 is a block diagram illustrating an example of a detailed configuration of a switching unit illustrated in FIG. 3.

In the present embodiment, a single reception unit 71 is used to detect both the basis weight and operation sound. For these detection functions to accurately operate, the reception signals from the reception unit 71 need to be allocated to the appropriate signal processing path at the appropriate timing. The switching unit 310 is configured to allocate the signals. Specifically, the switching unit 310 switches the output destination of the reception signals from the reception unit 71 between a signal processing path to the basis weight detection unit 320 and a signal processing path to the operation sound detection unit 340. FIG. 4 is a block diagram illustrating an example of a detailed configuration of the switching unit 310 illustrated in FIG. 3. Referring to FIG. 4, the switching unit 310 includes a switching circuit 311, an analog filter 312, an amplifier unit 313, and an amplifier unit 315.

In a case where the control unit 360 described below sets the switching circuit 311 to the basis weight detection mode, the switching circuit 311 outputs to the analog filter 312 the reception signal received from the reception unit 71 in accordance with a control signal indicating the basis weight detection mode. Also, in a case where the control unit 360 sets the switching circuit 311 to the operation sound detection mode, the switching circuit 311 outputs to the amplifier unit 315 the reception signal received from the reception unit 71 in accordance with a control signal indicating the operation sound detection mode. The analog filter 312 and the amplifier unit 313 belong to the signal processing path to the basis weight detection unit 320. By the reception signal input from the switching circuit 311 being filtered at the analog area, the analog filter 312 removes a signal component, included in the reception signal, of a band outside the ultrasonic wave band. Herein, the ultrasonic wave band may be the band from 35 KHz to 45 KHz, for example. In other words, the analog filter 312 may be a band-pass filter. The amplifier unit 313 amplifies the signal level (for example, voltage) of the ultrasonic wave band component of the reception signal having passed through the analog filter 312 and outputs the amplified signal (referred to as an ultrasonic wave level signal below) to the basis weight detection unit 320. The amplifier unit 315 belongs to the signal processing path to the operation sound detection unit 340. The amplifier unit 315 amplifies the signal level of the reception signal input from the switching circuit 311 and outputs the amplified signal (referred to as a sound wave level signal below) to the operation sound detection unit 340.

Typically, the vibration displacement of the reception unit 71 caused by the operation sound inside the image forming apparatus 100 is greater than the vibration displacement of the reception unit 71 caused by the ultrasonic waves transmitted from the transmission unit 31 in the basis weight detection mode. Thus, by setting the amplification factor of the signal level in the amplifier unit 315 to a value lower than the amplification factor of the signal level in the amplifier unit 313, the levels of the signals output from both signal processing paths can be normalized and the detection performance of the basis weight detection and the operation sound detection can be stabilized.

2.2 Basis Weight Detection Unit

Figure 5:
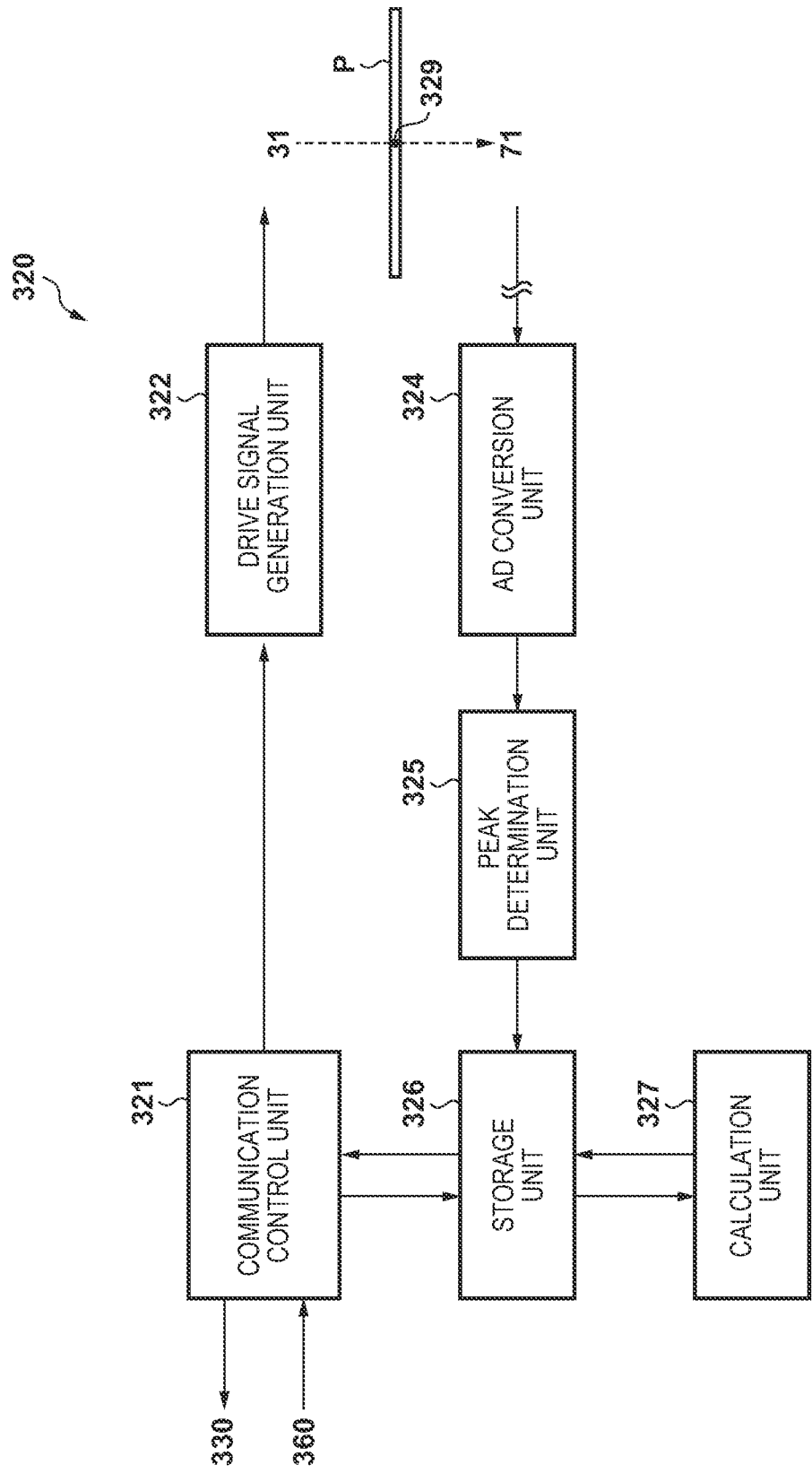
FIG. 5 is a block diagram illustrating an example of a detailed configuration of a basis weight detection unit illustrated in FIG. 3.

The basis weight detection unit 320 detects the basis weight of the recording material conveyed along the conveyance path on the basis of the ultrasonic waves received by the reception unit 71. Basis weight means the mass per unit area of the recording material and may be represented using the unit "$g/m^2$". FIG. 5 is a block diagram illustrating an example of a detailed configuration of the basis weight detection unit 320 illustrated in FIG. 3. Referring to FIG. 5, the basis weight detection unit 320 includes a communication control unit 321, a drive signal generation unit 322, an AD conversion unit 324, a peak detection unit 325, a storage unit 326, and a calculation unit 327.

The communication control unit 321, in the basis weight detection mode, instructs the drive signal generation unit 322 to output a drive signal to the transmission unit 31 at a timing designated by the control unit 360. The drive signal generation unit 322, on the basis of the instruction input from the communication control unit 321, generates a drive signal for making the transmission unit 31 transmit ultrasonic waves and outputs the generated drive signal to the transmission unit 31. The transmission unit 31, in response to the input of the drive signal from the drive signal generation unit 322, transmits ultrasonic waves toward the conveyance path (specifically, toward a detection position 329 of the conveyance path). The frequency of the ultrasonic waves transmitted by the transmission unit 31 is dependent on the configuration of the transmission unit 31 and the reception unit 71 and the desired detection accuracy and may be any frequency belonging to the ultrasonic wave band. For example, the frequency of the ultrasonic waves transmitted by the transmission unit 31 may be 32 KHz. In the basis weight detection mode, an ultrasonic wave level signal indicative of the signal level after amplification of the ultrasonic wave band component of the sound waves received by the reception unit 71 is input to the AD conversion unit 324 from the switching unit 310. The AD conversion unit 324 converts the signal region of the ultrasonic wave level signal from an analog region to a digital region and generates a digital format ultrasonic wave level signal. The peak detection unit 325 determines a peak value (maximal value) of the ultrasonic wave level signal input from the AD conversion unit 324 and stores the determined peak value in the storage unit 326. As is described below, the control unit 360 makes the basis weight detection unit 320 determine the peak value of the ultrasonic wave level signal at least once for each of a time when the recording material P does not exist at the detection position 329 and a time when the recording material P exists at the detection position 329. The storage unit 326 stores a plurality of peak values determined in this manner. The calculation unit 327 calculates, as a damping coefficient, the ratio of the peak value of the ultrasonic wave level signal when the recording material P exists to the peak value of the ultrasonic wave level signal when the recording material P does not exist and stores the calculated damping coefficient in the storage unit 326. The damping coefficient has a correlation with the basis weight of the recording material P and substantially represents the basis weight of the recording material P. Note that to reduce detection errors, the basis weight detection unit 320 may determine the peak value of the ultrasonic wave level signal a plurality of times (for example, 5 times) for when the recording material P exists at the detection position 329 and may calculate the damping coefficient using a representative value (for example, the average value) of the determination result. The communication control unit 321 reads the basis weight data (value of the damping coefficient) from the storage unit 326 and outputs the read basis weight data to the condition setting unit 330.

2.3 Condition Setting Unit

The condition setting unit 330 sets the operation condition of the image forming operation for the image forming apparatus 100 on the basis of the basis weight of the recording material detected by the basis weight detection unit 320. The operation condition of the image forming operation may be, for example, one or more of conveyance speed of the recording material, application bias for toner transfer on the recording material (application voltage applied to the secondary transfer roller 19), and heating temperature (target temperature for the fixing device 21) for fixing the toner on the recording material. For example, the condition setting unit 330 may determine the recording material type on the basis of the detected basis weight of the recording material and may set the value of the operation condition associated in advance with the determined type for the corresponding member of the image forming unit 1. By setting an operation condition suited to the type of recording material automatically determined in this manner, the power consumption of the image forming operation can be reduced, image quality can be improved, and the burden on the user to perform setting can be reduced.

2.4 Operation Sound Detection Unit

Figure 6:
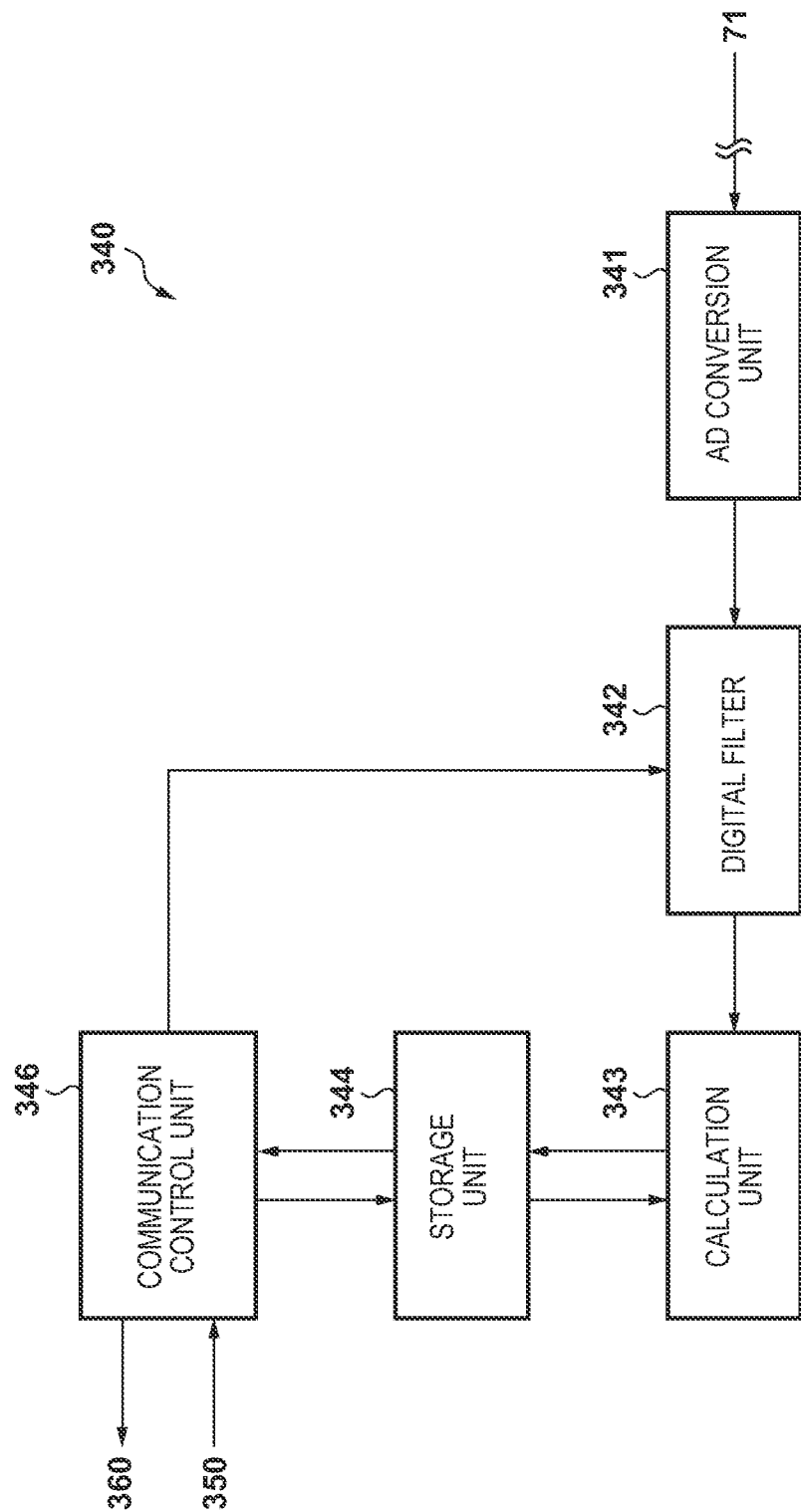
FIG. 6 is a block diagram illustrating an example of a detailed configuration of an operation sound detection unit illustrated in FIG. 3.

The operation sound detection unit 340 detects the operation sound that arises in the image forming apparatus 100 on the basis of the sound waves received by the reception unit 71. FIG. 6 is a block diagram illustrating an example of a detailed configuration of the operation sound detection unit 340 illustrated in FIG. 3. Referring the FIG. 6, the operation sound detection unit 340 includes an AD conversion unit 341, a digital filter 342, a calculation unit 343, a storage unit 344, and a communication control unit 346.

In the operation sound detection mode, the reception unit 71 receives sound waves that arise in the image forming apparatus 100. The sound waves include a frequency component in the audible range caused by the operation of the image forming unit 1, for example, and causes displacement of the vibration plate of the MEMS microphone in a similar manner to the ultrasonic waves. A sound wave level signal indicative of the signal level after amplification of the sound waves received by the reception unit 71 is input to the AD conversion unit 341 from the switching unit 310. The AD conversion unit 341 converts the signal region of the sound wave level signal from an analog region to a digital region and generates a digital format sound wave level signal. By the sound wave level signal input from the AD conversion unit 341 being filtered at the digital area, the digital filter 342 removes a signal component, included in the sound wave level signal, of a band outside a specific band and lets only the signal component of the specific band through. The digital filter 342 may variably set the band of the signal component to be let through on the basis of the instruction input from the communication control unit 346. For example, in a case of determining whether there is an abnormality in a specific member, by extracting only the signal component of a band particular to the operation sound of the member by the digital filter 342, abnormality diagnosis accuracy can be increased. For example, in a case of aiming to diagnose the state of a feeding-related member described below, the digital filter 342 may be set as a low-pass filter that lets through frequency components of 500 MHz or less. The calculation unit 343 executes a squaring operation and section averaging on the basis of the sound wave level signal passed through the digital filter 342 and generates sound wave level data indicating the average of the sound wave level absolute values for each time interval. Herein, the duration of the time intervals may be any duration such as 100 ms, for example. The calculation unit 343 may variably set the time interval duration depending on the type of member that is the target of abnormality diagnosis. The calculation unit 343 stores the generated sound wave level data in the storage unit 344. The storage unit 344 stores the sound wave level data generated for each time interval in this manner. The communication control unit 346 reads the sound wave level data from the storage unit 344 and outputs the read sound wave level data to the diagnosis unit 350.

2.5 Diagnosis Unit

The diagnosis unit 350 determines if an abnormality has arisen or if there is a symptom of an abnormality arising in the image forming apparatus 100 on the basis of the operation sound (represented by the sound wave level data) detected by the operation sound detection unit 340. For example, the diagnosis unit 350 compares the signal level indicated by the sound wave level data input from the operation sound detection unit 340 with a determination threshold for abnormality diagnosis. Then, in a case where the signal level is greater than the determination threshold, the diagnosis unit 350 may determine that an abnormality has arisen in the image forming apparatus 100. The diagnosis unit 350 may use a different determination threshold depending on the type of the member that is the target of abnormality diagnosis. Alternatively, in a case where the signal level is greater than a first determination threshold, the diagnosis unit 350 determines that an abnormality has arisen, and in a case where the signal level is not greater than the first determination threshold but is greater than a second determination threshold, the diagnosis unit 350 may determine that there is a symptom of an abnormality arising. Moreover, by comparing the sound wave level data to the known operation sound data of the members of the image forming unit 1, the diagnosis unit 350 may determine which member of the image forming unit 1 an abnormality has arisen in (or has a symptom of an abnormality).

In a case where the diagnosis unit 350 has determined that an abnormality has arisen or there is a symptom of an abnormality arising, the diagnosis unit 350 may inform the user of the determination result by displaying abnormality-related information on a screen of the operation/display unit 205, for example. The abnormality-related information may include information, such as the date and time the abnormality arose, the severity of the abnormality, and the location of the abnormality (the member suspected to have an abnormality), for example. Also, in a case where the diagnosis unit 350 has determined that an abnormality has arisen or there is a symptom of an abnormality arising, the diagnosis unit 350 may transmit the abnormality-related information to another device (for example, the management server, the user, or the terminal of a serviceman) via the communication I/F 206, for example. Furthermore, the diagnosis unit 350 may cause the condition setting unit 330 to set a particular operation condition for operations when there is an abnormality. By performing automatic abnormality diagnosis in this manner, the time needed for recovery from the abnormality arisen in the image forming apparatus 100 can be reduced, an abnormality can be prevented from arising at the stage when only symptoms are present, and investigation of the cause of the abnormality can be simplified.

2.6 Control Unit

The control unit 360 controls the timing of the detection of the basis weight by the basis weight detection unit 320 and the detection of the operation sound by the operation sound detection unit 340 so that both functions operate smoothly. Specifically, the control unit 360 outputs, at a first timing, the reception signal received by the switching unit 310 from the reception unit 71 to a first path to the operation sound detection unit 340 and makes the operation sound detection unit 340 detect the operation sound. Also, the control unit 360 outputs, at a second timing different from the first timing, the reception signal received by the switching unit 310 from the reception unit 71 to a second path to the basis weight detection unit 320 and makes the basis weight detection unit 320 detect the basis weight of the recording material. In the present specification, the mode for detecting the operation sound by the operation sound detection unit 340 is referred to as the operation sound detection mode, and the mode for detecting the basis weight by the basis weight detection unit 320 is referred to as the basis weight detection mode.

Figure 7:
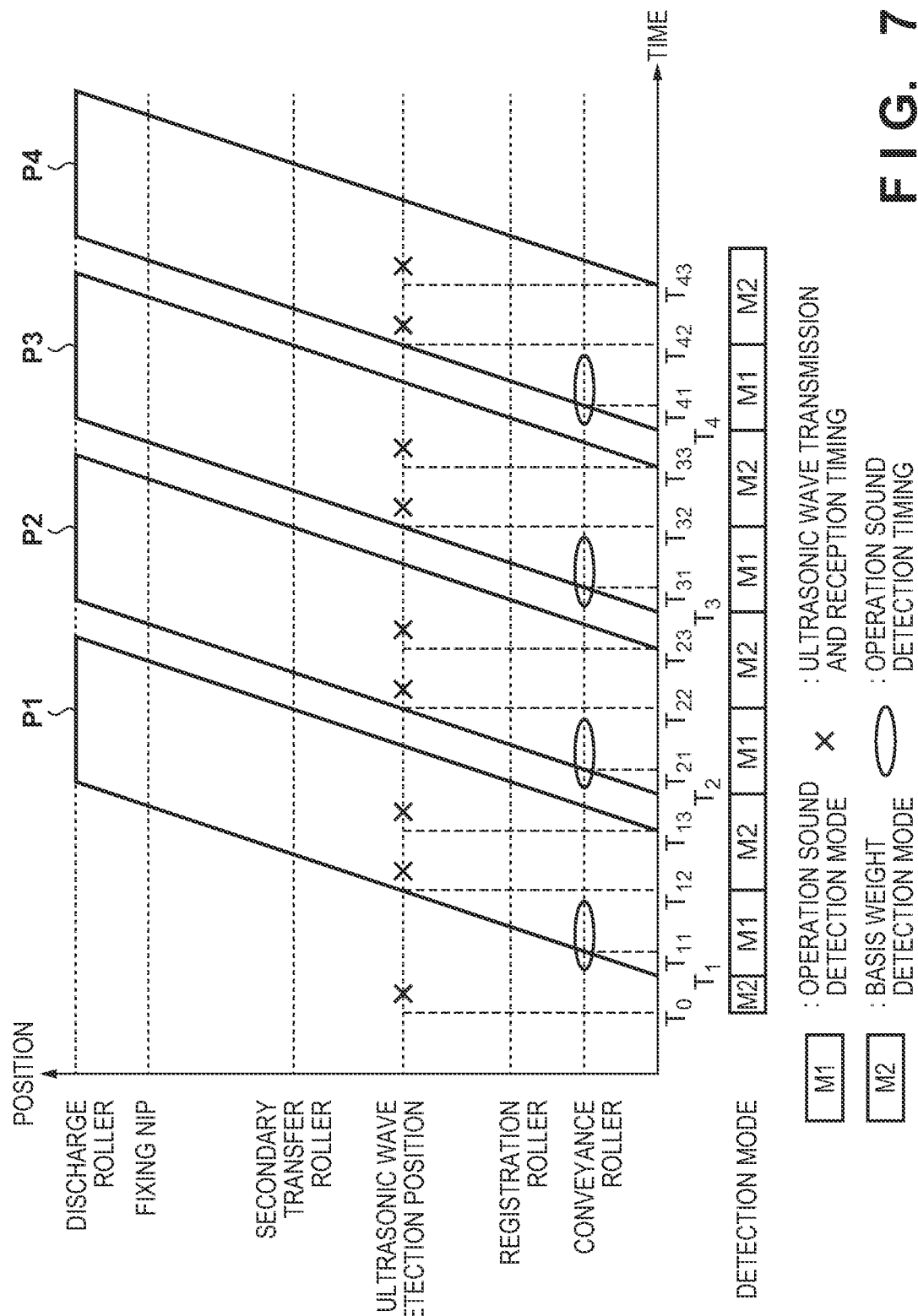
FIG. 7 is a timing chart illustrating a first control pattern for switching between a basis weight detection mode and an operation sound detection mode.

FIG. 7 is a timing chart illustrating a first control pattern for switching between the basis weight detection mode and the operation sound detection mode. In the first control pattern, the control unit 360 makes the transmission unit 31 transmit ultrasonic waves at the time that each of two target detection positions on the sheet passes the detection position 329 of the conveyance path. As an example, a first target detection position may be a position 10 mm back from the leading end of the sheet, and a second target detection position may be a central position of the sheet. In addition, the control unit 360 makes the transmission unit 31 transmit ultrasonic waves at a time when the sheet does not exist at the detection position 329. The control unit 360 makes the operation sound detection unit 340 detect the operation sound at times different from these times.

In FIG. 7, the horizontal axis represents time, and the vertical axis represents the conveyance position of the sheet along the conveyance path. In the diagram, the diagonal solid lines represent the conveyance position of the leading end and the trailing end of the sheets moving along the conveyance path. Under the horizontal axis, the detection mode the control unit 360 is set to at each point in time is indicated, with M1 meaning the operation sound detection mode and M2 meaning the basis weight detection mode. The X symbol represents the timing of ultrasonic wave transmission and reception, and the ellipse represents the timing of operation sound detection.

Specifically, firstly, at time $T_0$ before a sheet P1 is started to be conveyed, the control unit 360 sets the detection mode to the basis weight detection mode M2. In response to this, the basis weight detection unit 320 determines the peak value of the reception signal level of the ultrasonic waves transmitted at the time when a sheet does not exist at the detection position 329. Next, the control unit 360 sets the detection mode at time $T_1$ to the operation sound detection mode M1. The operation sound detection unit 340 continuously detects the operation sounds during a time period including time $T_{11}$ when the leading end of the sheet P1 arrives at the pair of conveyance rollers 6, for example, and the diagnosis unit 350 diagnoses whether or not there is an abnormality on the basis of the detected operation sounds. The operation sound detection mode M1 may be maintained for a predetermined duration of time (for example, 200 ms) after time $T_{11}$. The control unit 360 sets the detection mode at time Tia to the basis weight detection mode M2. In response to this, the basis weight detection unit 320 determines the peak value of the reception signal level of the ultrasonic waves transmitted at the time when the first target detection position of the sheet P1 passes the detection position 329. The control unit 360 maintains the basis weight detection mode M2 at time $T_{13}$, and the basis weight detection unit 320 determines the peak value of the reception signal level of the ultrasonic waves transmitted at the time when the second target detection position of the sheet P1 passes the detection position 329. Next, the control unit 360 sets the detection mode at time $T_2$ to the operation sound detection mode M1. The operation sound detection unit 340 continuously detects the operation sounds during a time period including time $T_{21}$ when the leading end of a sheet P2 conveyed next arrives at the pair of conveyance rollers 6, for example, and the diagnosis unit 350 diagnoses whether or not there is an abnormality on the basis of the detected operation sounds. Thereafter, the control unit 360 switches the detection mode in a similar way between the basis weight detection mode M2 and the operation sound detection mode M1 in a time-aligned manner with conveyance of sheets conveyed after the sheet P2. In an example in which the basis weight is confirmed on the basis of five peak values of the reception signal level of the ultrasonic waves, the basis weight may be confirmed at time $T_{33}$, for example. After time $T_{33}$, the basis weight may be updated each time the ultrasonic waves have been transmitted/received 5 times. Note that, to simply the explanation, in the example illustrated in FIG. 7, the conveyance speed of the sheets is not changed on the basis of the detected basis weight. In a case where the conveyance speed of the sheets is changed, the detection mode switch timing by the control unit 360 may change according to a change in the conveyance speed.

For example, an abnormality in the image forming unit 1 may include an abnormality in a member related to the feeding of sheets, such as the feeding roller 4, the separation roller 5, and the pair of conveyance rollers 6. The cause of the abnormality of the feeding-related member is mainly the progression of wear of the roller. For example, with the electromagnetic clutch (not illustrated) is off and the feeding roller 4 is stopped, when a sheet is conveyed and drawn out by the downstream pair of conveyance rollers 6, the separation roller 5 vibrates, causing an operation sound. This operation sound changes depending on the wear of the roller, and, when wear progresses, the operation sound may become an abnormal sound. In the configuration that the detection mode is switched according to the first control pattern described above, because the operation sound detection mode is set at the time the feeding-related members operates, the state of the feeding-related members can be reliably diagnosed. Furthermore, by calculating the damping coefficient of the ultrasonic waves at a plurality of locations on a single sheet, basis weight detection errors caused by variations in characteristics of sheets can be reduced. Because the timings of the basis weight detection (detection of ultrasonic waves) and the operation sound detection do not overlap with each other, the reception unit 71 can be appropriately shared between the two functions.

FIG. 8 is a timing chart illustrating a second control pattern for switching between the basis weight detection mode and the operation sound detection mode. In the second control pattern, the control unit 360 makes the transmission unit 31 transmit ultrasonic waves at the time that a central position (in other words, the second target detection position described above) of the sheet passes the detection position 329 of the conveyance path. In addition, the control unit 360 makes the transmission unit 31 transmit ultrasonic waves at a time when the sheet does not exist at the detection position 329. The control unit 360 makes the operation sound detection unit 340 detect the operation sound at times different from these times.

Specifically, firstly, at time $T_0$ before a sheet P1 is started to be conveyed, the control unit 360 sets the detection mode to the basis weight detection mode M2. In response to this, the basis weight detection unit 320 determines the peak value of the reception signal level of the ultrasonic waves transmitted at the time when a sheet does not exist at the detection position 329. Next, the control unit 360 sets the detection mode at time $T_1$ to the operation sound detection mode M1. The operation sound detection unit 340 continuously detects the operation sounds during a time period including time $T_{11}$ when the leading end of the sheet P1 arrives at the pair of conveyance rollers 6, for example, and the diagnosis unit 350 diagnoses whether or not there is an abnormality on the basis of the detected operation sounds. The control unit 360 sets the detection mode at time $T_{13}$ to the basis weight detection mode M2. In response to this, the basis weight detection unit 320 determines the peak value of the reception signal level of the ultrasonic waves transmitted at the time when the second target detection position of the sheet P1 passes the detection position 329. Next, the control unit 360 sets the detection mode at time $T_2$ to the operation sound detection mode M1. The operation sound detection unit 340 continuously detects the operation sounds during a time period including time $T_{21}$ when the leading end of a sheet P2 conveyed next arrives at the pair of conveyance rollers 6, for example, and the diagnosis unit 350 diagnoses whether or not there is an abnormality on the basis of the detected operation sounds. Thereafter, the control unit 360 switches the detection mode in a similar way between the basis weight detection mode M2 and the operation sound detection mode M1 in a time-aligned manner with conveyance of sheets conveyed after the sheet P2.

For example, an abnormality in the image forming unit 1 may include an abnormality in a cleaning-related member, such as the intermediate transfer belt 17 and the cleaning blade 35. An abnormality in a cleaning-related member is mainly caused by a change in the slide resistance between the intermediate transfer belt 17 and the cleaning blade 35 caused by wear of the surface of the intermediate transfer belt 17. As described above, the intermediate transfer belt 17 is rotationally driven while in contact with and sliding against the cleaning blade 35, causing an operation sound. The operation sound changes depending on the change in the slide resistance between the intermediate transfer belt 17 and the cleaning blade 35, and, when the wear progresses, the operation sound may become an abnormal sound. However, there is a possibility that this abnormal sound arises during the time period that image forming operation is being performed. Thus, by switching the detection mode according to the second control pattern described above, the ratio of the operation sound detection mode can be further increased compared to that of the first control pattern, and the state of the cleaning-related member can be further reliably diagnosed. Emitting ultrasonic waves at the central position of the sheet and calculating the damping coefficient means calculating the damping coefficient with the orientation of the sheet being in the most stable state during conveyance. This has the effect of reducing a decrease in the basis weight detection accuracy. For example, the sheets may be nipped by the secondary transfer roller 19 at the leading end and nipped by the pair of registration rollers 7 at the trailing end at the time that the central position of the sheet is located at the detection position 329. Also, as with the first control pattern, with the second control pattern, because the timing of the basis weight detection (detection of ultrasonic waves) and the operation sound detection do not overlap with each other, the reception unit 71 can be appropriately shared between the two functions.

The first control pattern and the second control pattern described using FIGS. 7 and 8 are slight examples of patterns for switching the detection mode by the control unit 360. The control unit 360 may switch the detection mode at a timing or frequency different from the timing and frequency illustrated. For example, a third control pattern may exist in which the detection mode is maintained in the operation sound detection mode at all times. Also, a fourth control pattern may exist in which the detection mode is switched depending on the page of the sheet conveyed. For example, the control unit 360 may set the detection mode to the basis weight detection mode only up until the K-th page (for example, K=1) of a bundle of sheets conveyed for one job is conveyed, and thereafter may set and keep the operation sound detection mode all the time. Either of these control patterns may be the predetermined control pattern normally used in the image forming apparatus 100. Also, in the present embodiment, in a case where a predetermined condition is satisfied, the control unit 360 changes from the in-use control pattern to another control pattern. In other words, in a case where a predetermined condition is satisfied, the control unit 360 outputs the reception signal received by the switching unit 310 from the reception unit 71 to the signal processing path to the operation sound detection unit 340 at a first timing when, according to the used control pattern, the basis weight detection mode would be set. Alternatively, in a case where a predetermined condition is satisfied, the control unit 360 outputs the reception signal received by the switching unit 310 from the reception unit 71 to the signal processing path to the basis weight detection unit 320 at a second timing when, according to the used control pattern, the operation sound detection mode would be set.

The predetermined condition described above for changing the control pattern includes, in a first practical example, a first condition being that a degree of degradation of a member causing an abnormal sound when the member has degraded, has reached a predetermined level. In a second practical example, the predetermined condition described above includes a second condition based on a comparison of variation in detected basis weights and a threshold. In a third practical example, the predetermined condition described above includes a third condition being that a user operation on the cassette 2 retaining recording material prior to conveyance has been detected. These practical examples will be described in more detail below. Also, these conditions may be combined in any way and other conditions may be used. For example, in a case where a detection mode is explicitly designated by the user, the designated detection mode may be set.

Figure 9A:
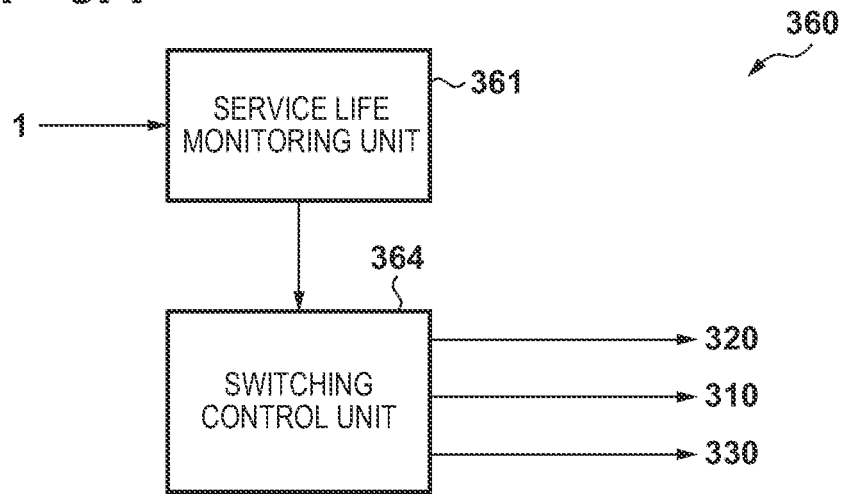
FIG. 9A is a block diagram illustrating a first practical example of a detailed configuration of a control unit illustrated in FIG. 3.
Figure 9B:
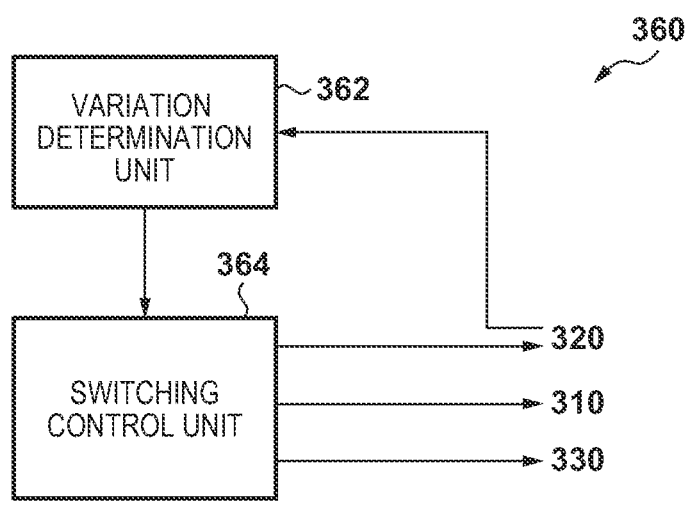
FIG. 9B is a block diagram illustrating a second practical example of a detailed configuration of the control unit illustrated in FIG. 3.
Figure 9C:
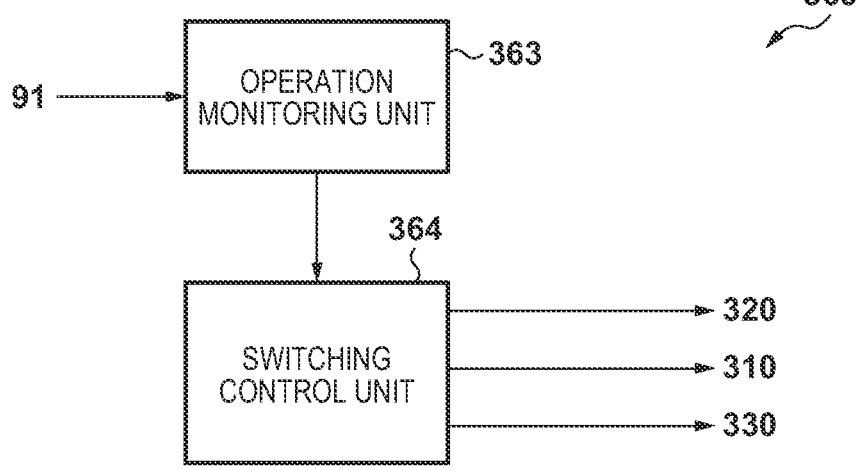
FIG. 9C is a block diagram illustrating a third practical example of a detailed configuration of the control unit illustrated in FIG. 3.

FIGS. 9A to 9C illustrate practical examples of detailed configurations of the control unit 360. In the first practical example illustrated in FIG. 9A, the control unit 360 includes a service life determination unit 361 and a switching control unit 364. The service life determination unit 361 monitors a degree of degradation of a member causing an abnormal sound when the member has degraded, the member being one of the members constituting the image forming unit 1. Also, the service life determination unit 361 determines whether or not the degree of degradation of the monitored member has reached a predetermined level. For example, the number of times the feeding operation has been performed may be used as an index of the degree of degradation of a feeding-related member. Herein, the durability period of the feeding-related member is assumed to be 150000 feeding operations. In this case, the threshold acting as the trigger to change the detection mode control pattern may be 80% of the 150000 times, i.e., 120000 times, for example. In this case, when the number of times the feeding operation has been performed reaches 120000, the service life determination unit 361 may determine that the feeding-related member has reached the end of its durability period (in other words, the degree of degradation of the feeding-related member has reached a predetermined level). In response to the service life determination unit 361 determining that the degree of degradation of the member to be monitored has reached the predetermined level, the switching control unit 364 changes the pattern of the switching control of the detection mode. For example, the switching control unit 364 may set the detection mode to the operation sound detection mode at the time when, according to the control pattern prior to the degree of degradation reaching the predetermined level, the basis weight detection mode would be set.

FIG. 10 is a timing chart illustrating an example of the detection mode transition in a case where the control pattern is changed according to the first practical example. Below the timing chart, the control pattern used by the control unit 360 at each point in time is indicated. In the example illustrated in FIG. 10, in the initial stage of the image forming operation, the first control pattern (control pattern C1) of the switching control as described using FIG. 7 is used. In other words, the switching control unit 364 sequentially sets the detection mode to the basis weight detection mode at time $T_0$, to the operation sound detection mode at time $T_1$, to the basis weight detection mode at time $T_{12}$, and the operation sound detection mode at time $T_2$, and so on thereafter. However, in this example, the service life determination unit 361, while a sheet P3 is being conveyed, determines that the degree of degradation of the target member for monitoring has reached the predetermined level. In response to this, the switching control unit 364, at time $T_4$, changes the control pattern from the control pattern C1 to a control pattern C3. In the control pattern C3, the switching control unit 364 maintains the detection mode in the operation sound detection mode at all times. For example, even at times $T_{42}$ and $T_{43}$, when the basis weight detection mode would be set according to the control pattern C1, the operation sound is detected by the operation sound detection unit 340 and the diagnosis unit 350 diagnoses an abnormality or not. In this manner, in the initial stages, the basis weight detection is performed frequently, and after the degree of degradation of the member progresses a certain amount, the frequency of the operation sound detection is increased. This allows the basis weight to be swiftly confirmed and an appropriate operation condition for the image forming operation to be set in a time period other than the end of the durability period of the member.

In the second practical example illustrated in FIG. 9B, the control unit 360 includes a variation determination unit 362 and the switching control unit 364. The variation determination unit 362 monitors the variation in basis weights detected by the basis weight detection unit 320 and determines whether the variation in the basis weights is greater than or less than a predetermined threshold. For example, the variation in the basis weights may be calculated as the absolute value of the difference between the average value of the basis weight detection result for the last M times and the maximum value from the basis weight detection result. The threshold compared to the variation may be a value corresponding to 5% of the average value of the basis weight detection result, for example. In a case where the variation determination unit 362 determines that the variation in the basis weights is less than the threshold described above, the switching control unit 364 may set the detection mode to the operation sound detection mode at the time when the basis weight detection mode would be set. Conversely, in a case where the variation determination unit 362 determines that the variation in the basis weight is greater than a threshold, the switching control unit 364 may set the detection mode to the basis weight detection mode at the time when the operation sound detection mode would be set. The two thresholds compared to the variation in basis weight may be different from each other.

Figure 11:
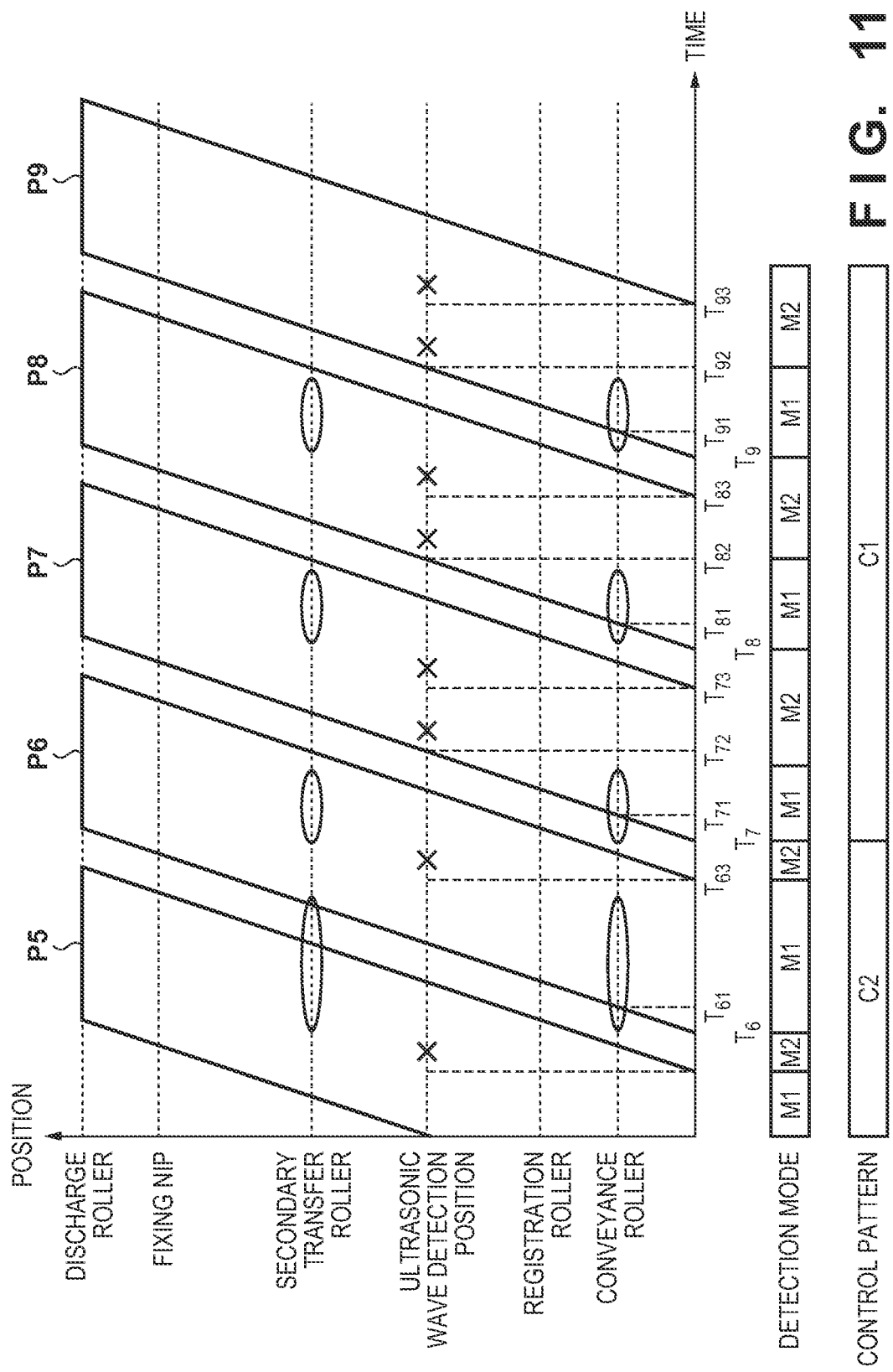
FIG. 11 is a timing chart illustrating another example of the detection mode transition in a case where the control pattern is changed.

FIG. 11 is a timing chart illustrating an example of the detection mode transition in a case where the control pattern is changed according to the second practical example. In the example illustrated in FIG. 11, in the intermediate stage of the image forming operation, the second control pattern (control pattern C2) of the switching control as described using FIG. 8 is used. For example, the switching control unit 364 sets the detection mode to the operation sound detection mode at time $T_6$ and sets the detection mode to the basis weight detection mode at time $T_{63}$. Herein in this example, the variation determination unit 362 determines that the variation of the basis weight detection result for the most recent M number of times detected by the basis weight detection unit 320 is greater than the predetermined threshold described above. In response to this, the switching control unit 364, at time $T_7$, changes the control pattern from the control pattern C2 to a control pattern C1. In the control pattern C1, basis weight detection is performed more frequently than in the control pattern C2. For example, at time $T_{72}$ when the operation sound detection mode would be kept unchanged according to the control pattern C2, the switching control unit 364 sets the detection mode to the basis weight detection mode. In this manner, by changing the frequency of the basis weight detection depending on variation in basis weights being monitored, basis weight detection accuracy can be maintained at a certain level and time for abnormality diagnosis can be efficiently secured.

In the third practical example illustrated in FIG. 9C, the control unit 360 includes an operation monitoring unit 363 and the switching control unit 364. The operation monitoring unit 363 monitors the sensor signal from the cassette sensor 91. The sensor signal indicates the presence of a user operation on the cassette 2 (for example, the cassette 2 being pulled out or pushed in). In a case where a user operation on the cassette 2 is detected on the basis of the sensor signal, the operation monitoring unit 363 records the user operation history in the memory. In an image forming operation, in a case where the records in the memory indicate that there has been a user operation on the cassette 2, the switching control unit 364 changes the control pattern of the detection mode. For example, in a case where there has not been a user operation on the cassette 2, the switching control unit 364 maintains the control pattern used in the previous image forming operation. On the other hand, in a case where there has been a user operation on the cassette 2, the switching control unit 364, at least in the initial stage of the image forming operation, may use a control pattern with a higher ratio of the basis weight detection mode. By preferentially performing basis weight detection when there has been a user operation on the retaining unit retaining the recording material in this manner, a change of the type of recording material can be reliably known and the operation condition can be set appropriately and time for abnormality diagnosis can be efficiently secured.

3. Process Flow

3.1 Detection Mode Switching Process (1) First Control Pattern

Figure 12A:
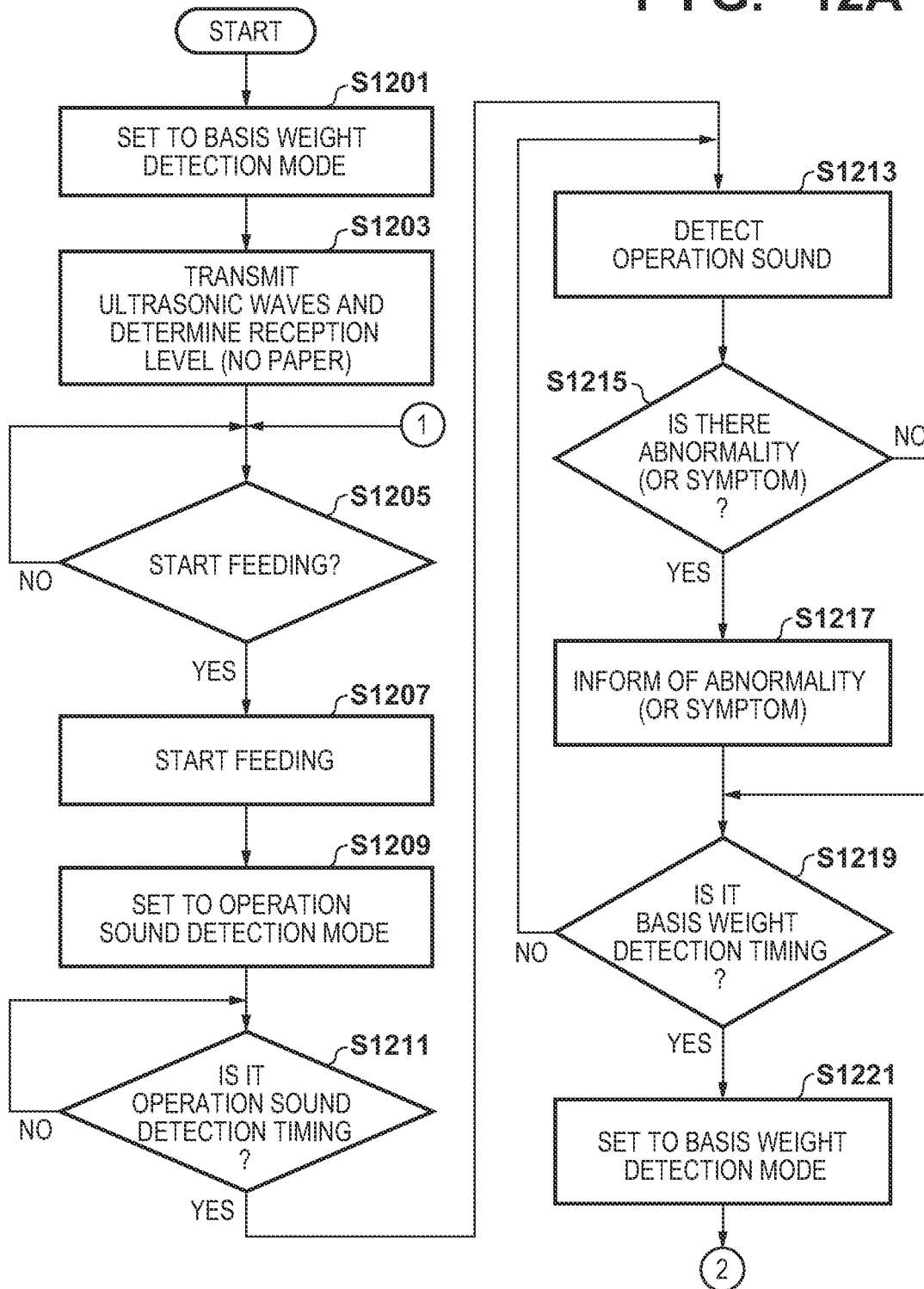
FIGS. 12A and 12B show a flowchart illustrating an example of the flow of the detection mode switching process of a first control pattern.
Figure 12B:
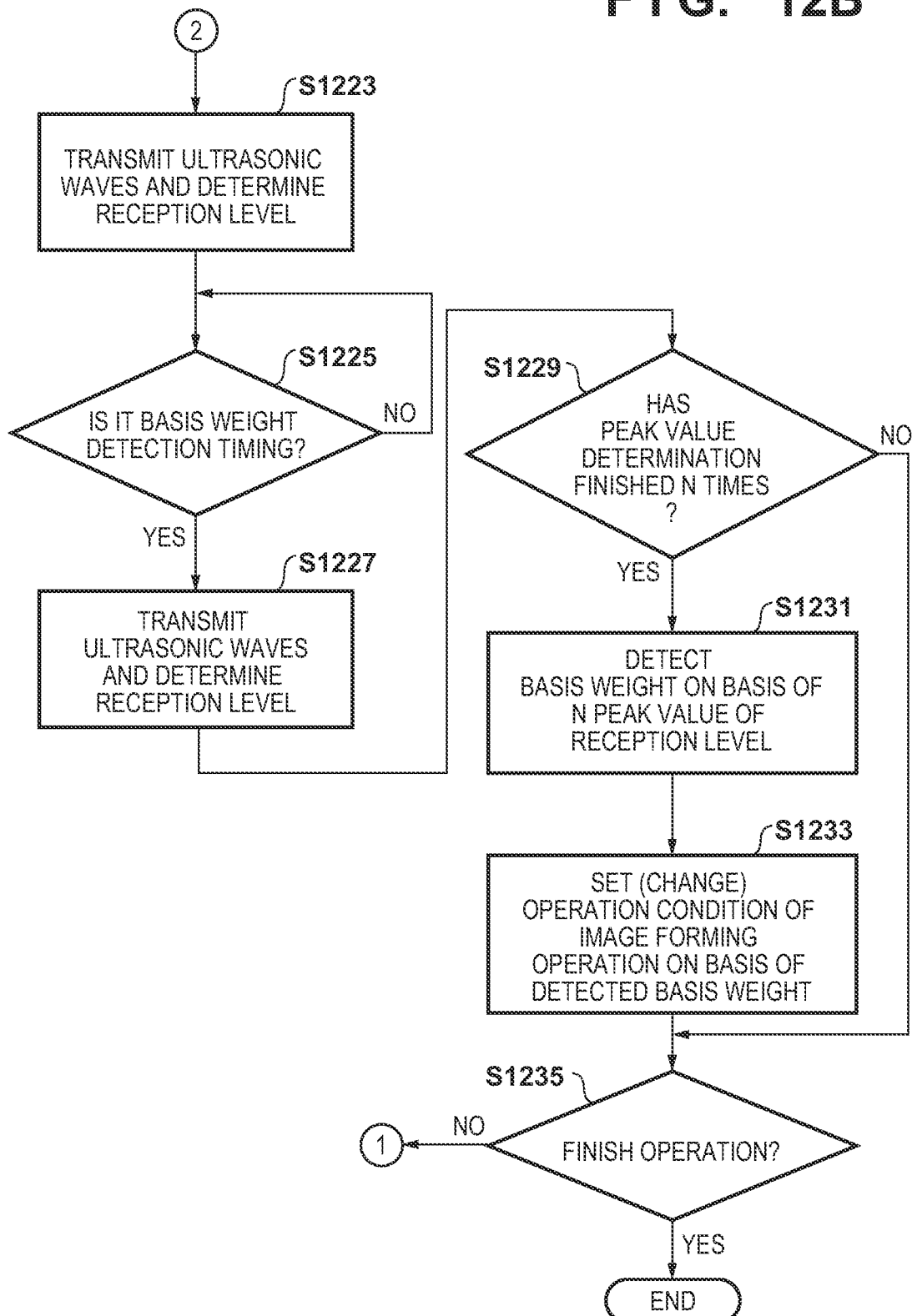

FIGS. 12A and 12B show a flowchart illustrating an example of the flow of the detection mode switching process of the first control pattern described using FIG. 7. The illustrated process may be implemented by the CPU 207 executing a computer program load from the ROM 208 on the RAM 209, for example. Note that in the following description, processing step is shortened to S (step).

First, in step S1201, the control unit 360 sets the detection mode to the basis weight detection mode. Next, in step S1203, the basis weight detection unit 320 makes the transmission unit 31 transmit ultrasonic waves at a time when the recording material does not exist at the detection position 329, and determines a peak value of the signal level of the ultrasonic waves received by the reception unit 71.

Then, in step S1205, the control unit 360 waits for the appropriate timing to start feeding. When the appropriate timing to start feeding arrives, in step S1207, the control unit 360 starts feeding the recording material. The recording material is feed from the cassette 2 to the conveyance path by the feeding-related member and conveyed along the conveyance path.

Next, in step S1209, the control unit 360 sets the detection mode to the operation sound detection mode. Then, in step S1211, the control unit 360 waits for the appropriate timing to detect operation sound. When the appropriate timing to detect operation sound arrives, in step S1213, by generating sound wave level data on the basis of the sound waves received by the reception unit 71, the operation sound detection unit 340 detects operation sound arising in the image forming apparatus 100. Next, in step S1215, the diagnosis unit 350 determines if an abnormality has arisen or if there is a symptom of an abnormality arising in the image forming apparatus 100 on the basis of the sound wave level data generated by the operation sound detection unit 340. In a case where it has been determined that an abnormality has arisen or there is a symptom of an abnormality arising in the image forming apparatus 100, the diagnosis unit 350 in step S1217 informs the user that an abnormality has arisen or that there is a symptom of an abnormality arising (by displaying abnormality-related information on a screen or transmitting abnormality-related information to another device, for example). In a case where it is determined that no abnormality has arisen and there is no symptom of an abnormality arising, step S1217 is skipped. Then, in step S1219, in a case where the time for basis weight detection has arrived, the process proceeds to step S1221. In a case where the time for basis weight detection has not arrived, the process returns to step S1213, and operation sound detection and diagnose may be repeated.

In step S1221, the control unit 360 sets the detection mode to the basis weight detection mode. Next, in step S1223, the basis weight detection unit 320 makes the transmission unit 31 transmit ultrasonic waves at a time when the first target detection position of the recording material passes the detection position 329, and determines a peak value of the signal level of the ultrasonic waves received by the reception unit 71. Next, in step S1225, the basis weight detection unit 320 waits for the second target detection position of the recording material to pass the detection position 329. Next, in step S1227, the basis weight detection unit 320 makes the transmission unit 31 transmit ultrasonic waves at a time when the second target detection position of the recording material passes the detection position 329, and determines a peak value of the signal level of the ultrasonic waves received by the reception unit 71.

Then, in step S1229, the basis weight detection unit 320 determines whether determination of a peak value at a time when the recording material exists at the detection position 329 has performed N times (for example, N=5). In a case where determination of a peak value has performed N times, in step S1231, the basis weight detection unit 320 detects the basis weight of the recording material on the basis of the peak values of the ultrasonic wave level signal for N times and the peak value determined in step S1203. Next, in step S1233, the condition setting unit 330 sets or changes the operation condition of the image forming operation for the image forming apparatus 100 on the basis of the basis weight of the recording material detected by the basis weight detection unit 320. In a case where determination of a peak value has not yet been performed N times, step S1231 and step S1233 are skipped.

Next, in step S1235, the control unit 360 determines whether to finish the image forming operation. For example, in a case where image formation on a plurality of recording materials designated by a print job has finished, the control unit 360 determines to finish the image forming operation. In a case where the image forming operation has not finished, the process returns to step S1205, and the process described above is repeated for the next recording material.

Though not illustrated in FIGS. 12A and 12B, while the process described above is being executed, the image forming unit 1 performs an image forming operation. In the image forming operation, for example, the feeding-related members, such as the feeding roller 4, the separation roller 5, and the pair of conveyance rollers 6, feed the recording material to the conveyance path. The primary transfer roller 16 transfers an electrostatic latent image formed on the photosensitive member 11 to the intermediate transfer belt 17, and the secondary transfer roller 19 transfers a developer image of the intermediate transfer belt 17 to the recording material. The cleaning blade 35 collects developer remaining on the intermediate transfer belt 17 in the cleaning unit 36. The fixing device 21 applies heat and pressure to the recording material to fix the developer image to the recording material. Thereafter, the recording material is discharged to a discharge tray by the pair of discharge rollers 22, for example. An operation sound that arises during these operations may be detected by the operation sound detection unit 340 when the detection mode is set to the operation sound detection mode.

(2) Second Control Pattern

Figure 13A:
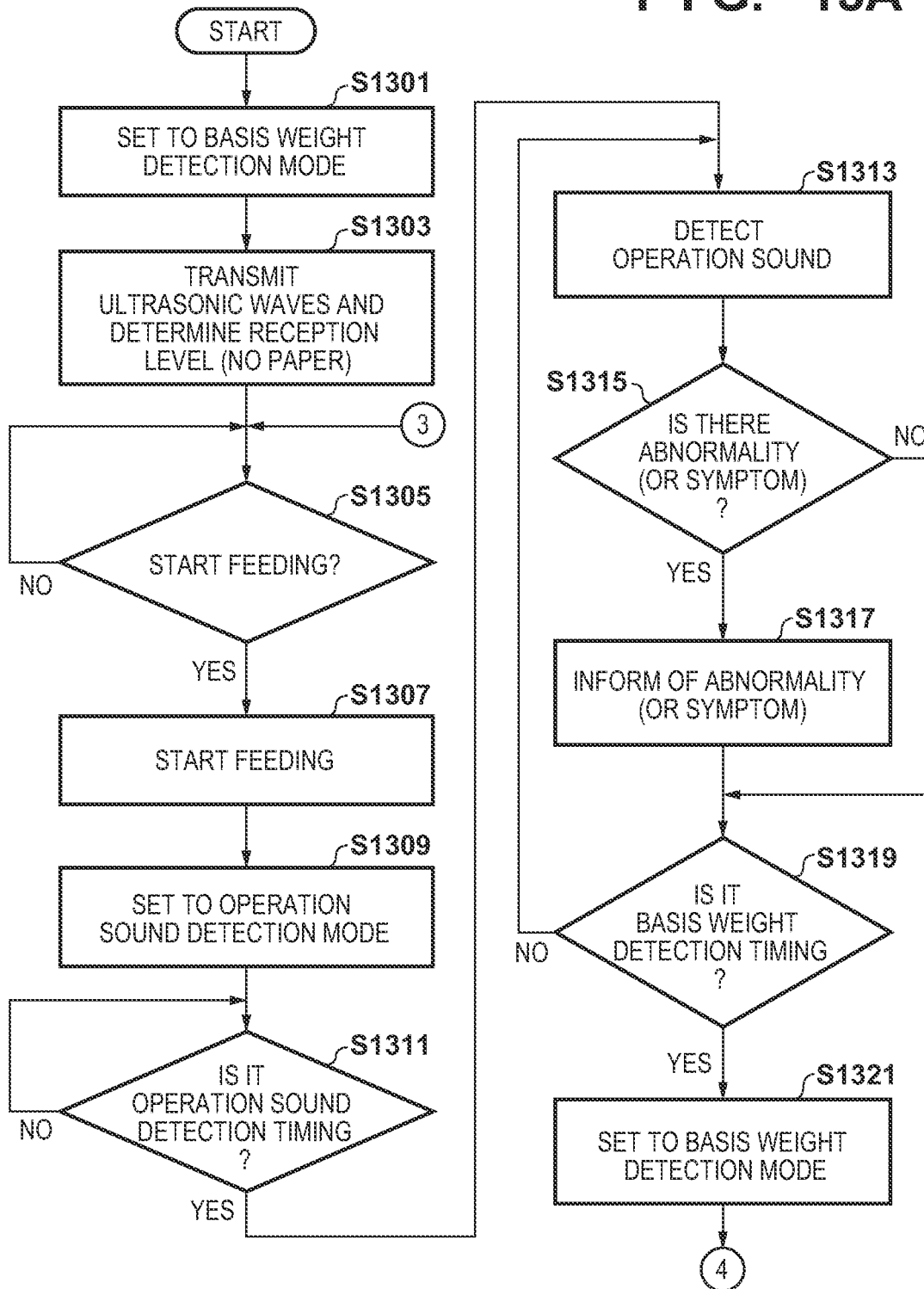
FIGS. 13A and 13B show a flowchart illustrating an example of the flow of the detection mode switching process of a second control pattern.
Figure 13B:
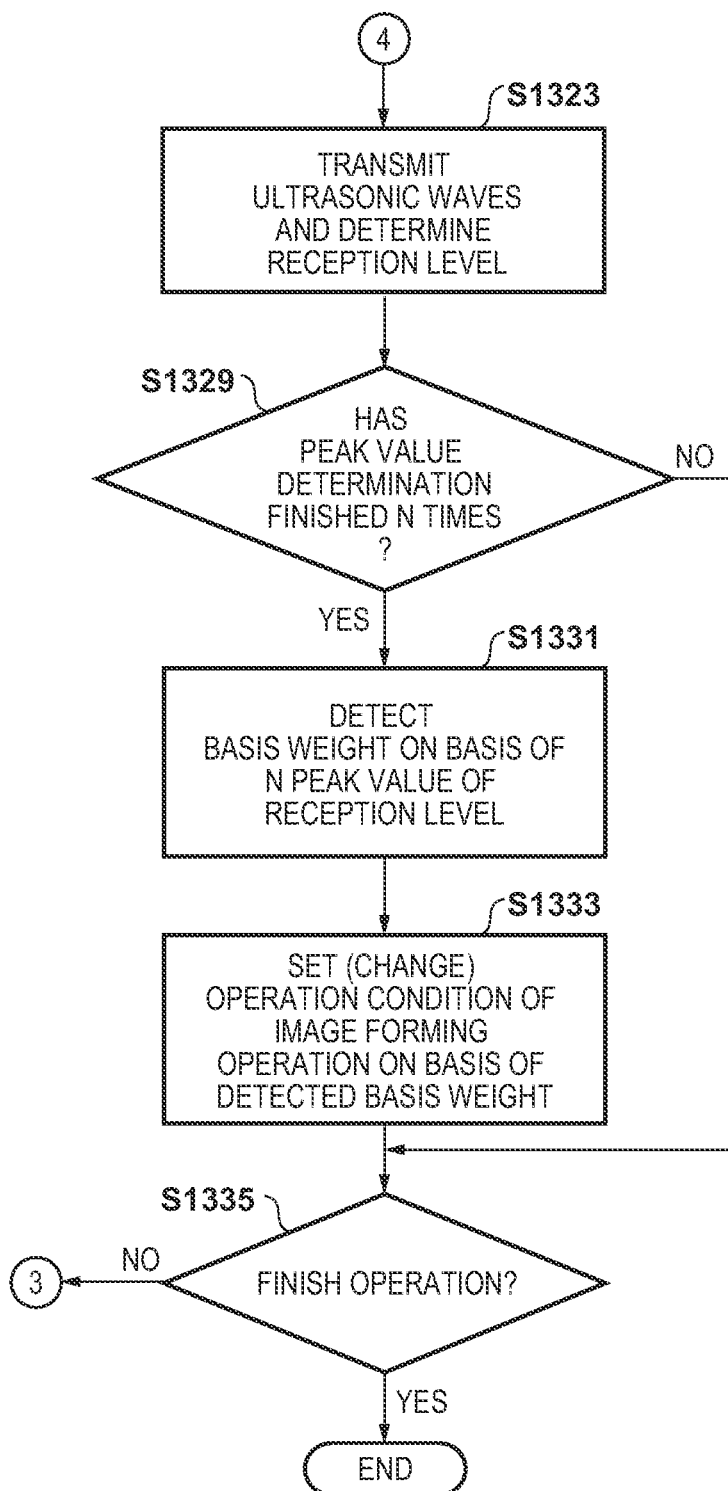
Figure 14:
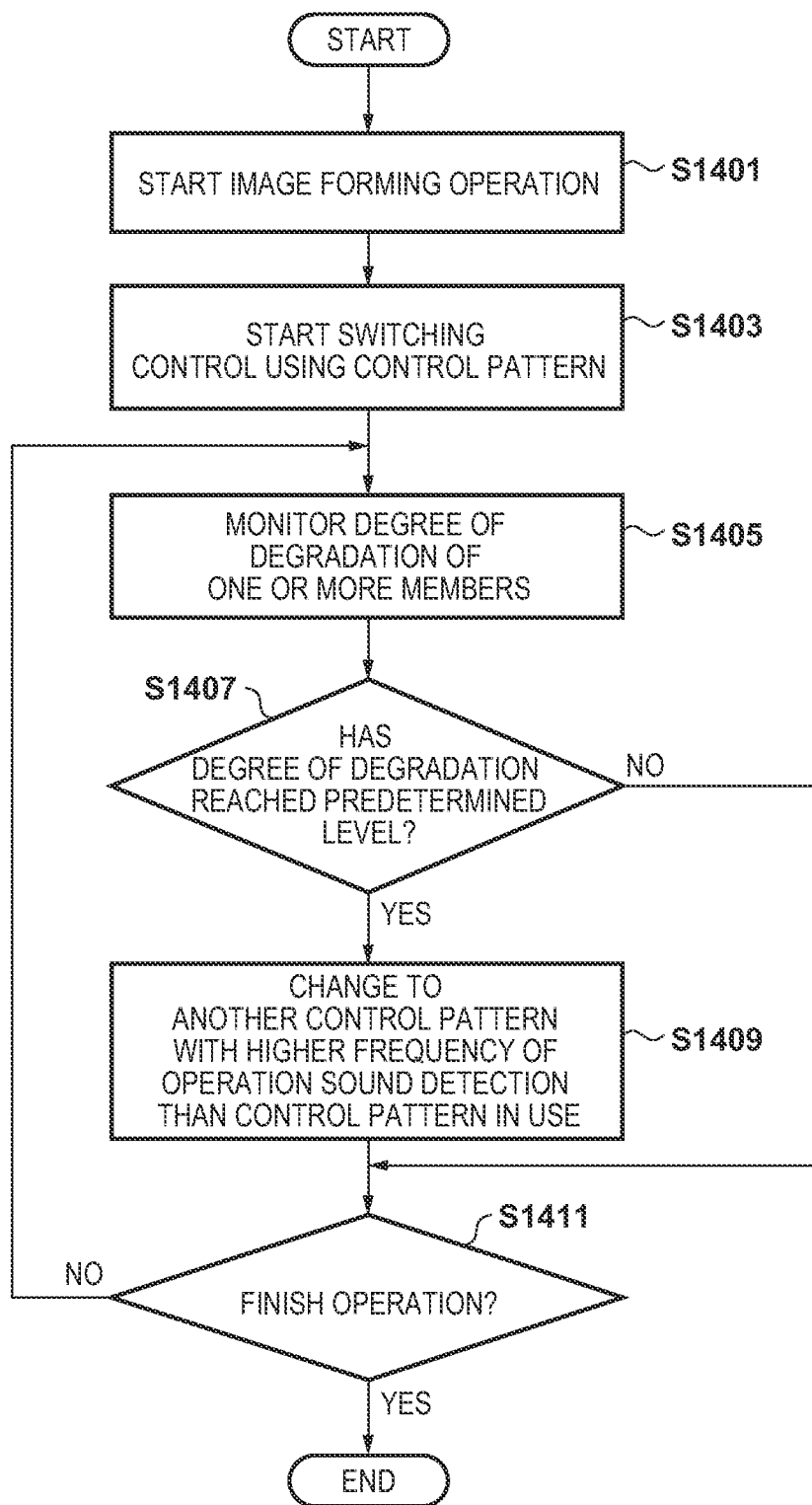
FIG. 14 shows a flowchart illustrating an example of the flow of the process of changing the control pattern according to the first practical example.
Figure 15:
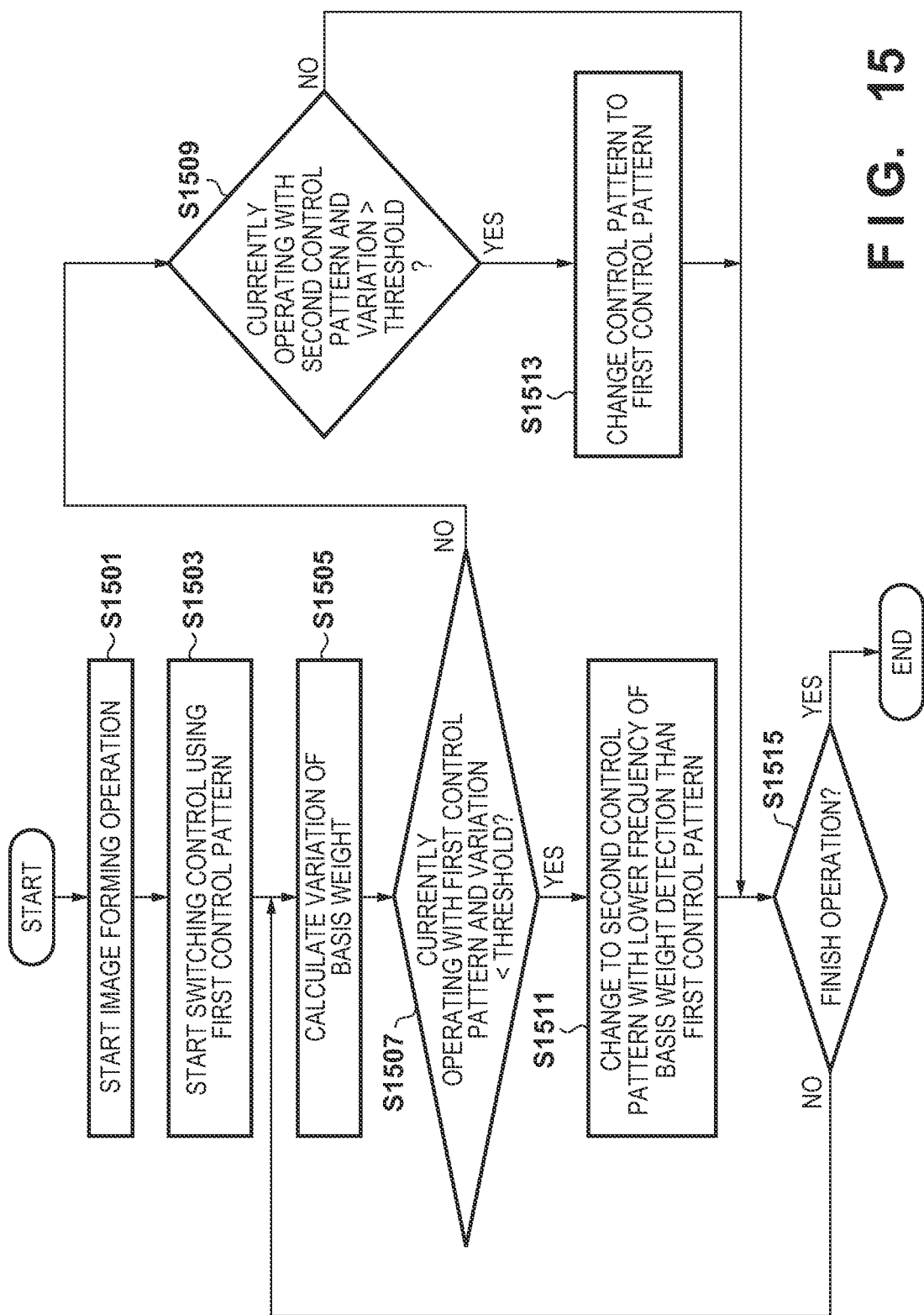
FIG. 15 shows a flowchart illustrating an example of the flow of the process of changing the control pattern according to the second practical example.
Figure 16A:
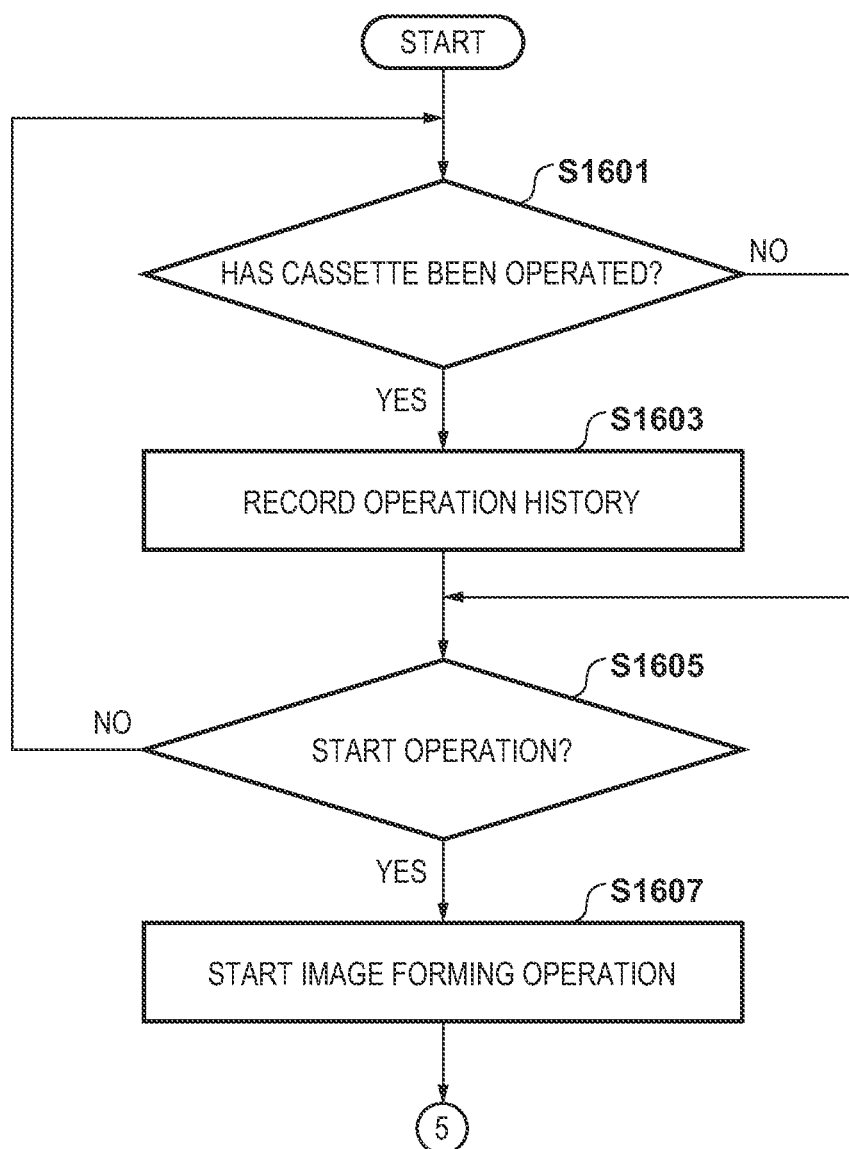
FIGS. 16A and 16B show a flowchart illustrating an example of the flow of the process of changing the control pattern according to the third practical example.
Figure 16B:
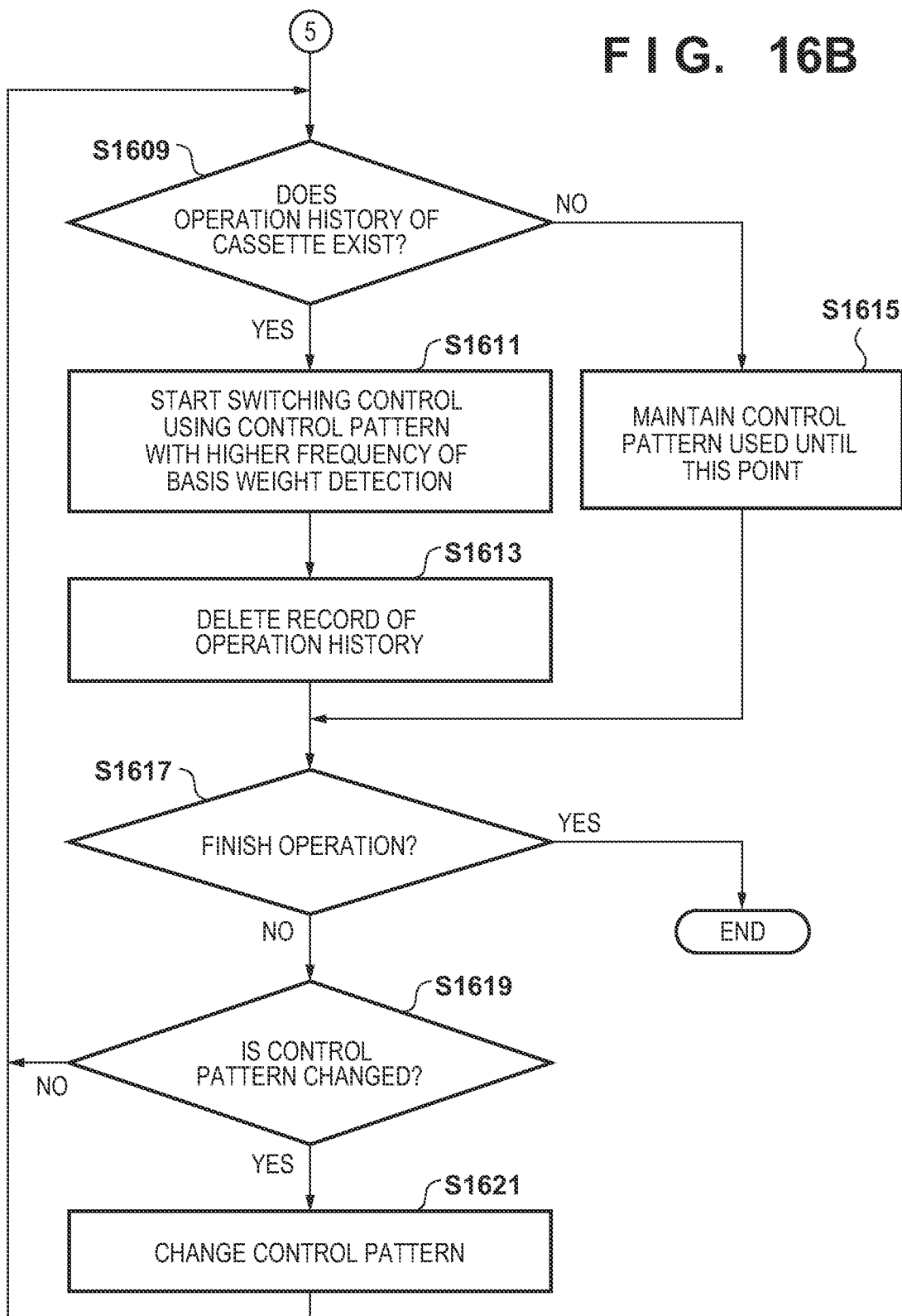

FIGS. 13A and 13B show a flowchart illustrating an example of the flow of the detection mode switching process of the second control pattern described using FIG. 8. The illustrated process may be implemented by the CPU 207 executing a computer program load from the ROM 208 on the RAM 209, for example.

First, in step S1301, the control unit 360 sets the detection mode to the basis weight detection mode. Next, in step S1303, the basis weight detection unit 320 makes the transmission unit 31 transmit ultrasonic waves at a time when the recording material does not exist at the detection position 329, and determines a peak value of the signal level of the ultrasonic waves received by the reception unit 71.

Then, in step S1305, the control unit 360 waits for the appropriate timing to start feeding. When the appropriate timing to start feeding arrives, in step S1307, the control unit 360 starts feeding the recording material. The recording material is feed from the cassette 2 to the conveyance path by the feeding-related member and conveyed along the conveyance path.

Next, in step S1309, the control unit 360 sets the detection mode to the operation sound detection mode. Then, in step S1311, the control unit 360 waits for the appropriate timing to detect operation sound. When the appropriate timing to detect operation sound arrives, in step S1313, by generating sound wave level data on the basis of the sound waves received by the reception unit 71, the operation sound detection unit 340 detects operation sound arising in the image forming apparatus 100. Next, in step S1315, the diagnosis unit 350 determines if an abnormality has arisen or if there is a symptom of an abnormality arising in the image forming apparatus 100 on the basis of the sound wave level data generated by the operation sound detection unit 340. In a case where it has been determined that an abnormality has arisen or there is a symptom of an abnormality arising in the image forming apparatus 100, the diagnosis unit 350 in step S1317 informs the user that an abnormality has arisen or that there is a symptom of an abnormality arising. In a case where it is determined that no abnormality has arisen and there is no symptom of an abnormality arising, step S1317 is skipped. Then, in step S1319, in a case where the time for basis weight detection has arrived, the process proceeds to step S1321. In a case where the time for basis weight detection has not arrived, the process returns to step S1313, and operation sound detection and diagnose may be repeated.

In step S1321, the control unit 360 sets the detection mode to the basis weight detection mode. Next, in step S1323, the basis weight detection unit 320 makes the transmission unit 31 transmit ultrasonic waves at a time when the second target detection position of the recording material passes the detection position 329, and determines a peak value of the signal level of the ultrasonic waves received by the reception unit 71.

Then, in step S1329, the basis weight detection unit 320 determines whether determination of a peak value at the time when the recording material exists at the detection position 329 has performed N times. In a case where determination of a peak value has performed N times, in step S1331, the basis weight detection unit 320 detects the basis weight of the recording material on the basis of the peak values of the ultrasonic wave level signal for N times and the peak value determined in step S1303. Next, in step S1333, the condition setting unit 330 sets or changes the operation condition of the image forming operation for the image forming apparatus 100 on the basis of the basis weight of the recording material detected by the basis weight detection unit 320. In a case where determination of a peak value has not yet been performed N times, step S1331 and step S1333 are skipped.

Next, in step S1335, the control unit 360 determines whether to finish the image forming operation. For example, in a case where image formation on a plurality of recording materials designated by a print job has finished, the control unit 360 determines to finish the image forming operation. In a case where the image forming operation has not finished, the process returns to step S1305, and the process described above is repeated for the next recording material. While the process described above is being executed, image forming operation is performed by the image forming unit 1. An operation sound that arises during the image forming operation may be detected by the operation sound detection unit 340 when the detection mode is set to the operation sound detection mode.

3.2 Change in Control Pattern

FIGS. 14 to 16B illustrate examples of a process flow for changing the control pattern according to the first, second, and third practical examples described above. These processes may be implemented by the CPU 207 executing a computer program load from the ROM 208 on the RAM 209, for example.

(1) First Practical Example

First, in step S1401, the control unit 360 starts the image forming operation in response to receiving a print job from an external host computer. In step S1403, the switching control unit 364 starts the switching control of the detection mode between the basis weight detection mode and the operation sound detection mode using a control pattern (for example, the first control pattern described above). While image forming operation is being performed, the service life determination unit 361 in step S1405 monitors the degree of degradation of the member (for example, the feeding-related member and the cleaning-related member) that causes an abnormal sound when the member has degraded, the member being a member relating to the image forming operation. In step S1407, the service life determination unit 361 determines whether or not the degree of degradation of the target member for monitoring has reached a predetermined level. In a case where it is determined that the degree of degradation of the target member for monitoring has reached a predetermined level, the switching control unit 364 changes the control pattern in use to another control pattern with a higher frequency of operation sound detection (for example, the second or third control pattern described above). In a case where it is determined that the degree of degradation of the target member for monitoring has not reached the predetermined level, step S1409 is skipped. Next, in step S1411, the control unit 360 determines whether to finish the image forming operation. In a case where it is determined to finish the image forming operation, the control unit 360 stops monitoring by the service life determination unit 361. In a case of not finishing the image forming operation, the process returns to step S1405, and monitoring of the degree of degradation of the member by the service life determination unit 361 continues.

Note that in the basis weight detection mode M2, ultrasonic waves are transmitted from the transmission unit 31 toward the conveyance path. Thus, increasing the frequency of basis weight detection corresponds to setting the duration of the time period in which ultrasonic waves are transmitted from the transmission unit 31 (referred to below as an ultrasonic wave transmission period) to a longer duration, and reducing the frequency of basis weight detection corresponds to setting the duration of the ultrasonic wave transmission period to a shorter duration. Herein, as a first application example of the first practical example, in a case where a degree of degradation of a member has not reached a predetermined level, the switching control unit 364 sets the duration of the ultrasonic wave transmission period to a predetermined duration. Then, in a case where the degree of degradation of the member has reached the predetermined level, the switching control unit 364 may set the duration of the ultrasonic wave transmission period to a duration shorter than the predetermined duration.

As a second application example of the first practical example, the switching control unit 364 may be capable of changing a ratio of the duration of the time period of the basis weight detection mode M2 (referred to below as the basis weight detection period) to the duration of the time period of the operation sound detection mode M1 (referred to below as the operation sound detection period) in the time period in which one sheet of recording material P passes the detection position 329 between the transmission unit 31 and the reception unit 71. In other words, in a case where a degree of degradation of a member has not reached a predetermined level, the switching control unit 364 sets the ratio of the duration of the basis weight detection period to a predetermined value. Then, in a case where the degree of degradation of the member has reached the predetermined level, the switching control unit 364 may set the ratio to a value less than the predetermined value. For example, the ratio may be reconfigured (i.e., changed) to a value less than 1 so that the duration of the operation sound detection period is longer than the duration of the basis weight detection period. The duration of the basis weight detection period after the degree of degradation of the member has reached the predetermined level may be even zero as indicated in the control pattern C3 of FIG. 10.

(2) Second Practical Example

First, in step S1501, the control unit 360 starts the image forming operation in response to receiving a print job from an external host computer. In step S1503, the switching control unit 364 starts the switching control of the detection mode between the basis weight detection mode and the operation sound detection mode using the first control pattern, for example. While the image forming operation is being performed, the basis weight detection unit 320 detects the basis weight of the recording material. In step S1505, the variation determination unit 362 calculates variation in basis weights detected by the basis weight detection unit 320. Next, in step S1507 and step S1509, the basis weight detection unit 320 compares the calculated variation in the basis weights and the threshold. For example, in a case where the current control pattern is the first control pattern and the variation in the basis weights is less than the predetermined threshold, the process proceeds to step S1511. Also, in a case where the current control pattern is the second control pattern and the variation in the basis weights is greater than the predetermined threshold, the process proceeds to step S1513. In step S1511, the switching control unit 364 changes the control pattern from the first control pattern to the second control pattern with a lower frequency of basis weight detection. In step S1513, the switching control unit 364 changes the control pattern from the second control pattern to the first control pattern. In a case where the conditions of step S1507 and step S1509 are both not satisfied, the step S1511 and step S1513 are both skipped. Next, in step S1515, the control unit 360 determines whether to finish the image forming operation. In a case where it is determined to finish the image forming operation, the control unit 360 stops calculating the variation in the basis weight by the variation determination unit 362. In a case of not finishing the image forming operation, the process returns to step S1505, and monitoring of the variation in the basis weight continues.

Note that as described in relation to the first practical example, increasing the frequency of basis weight detection corresponds to setting the duration of the ultrasonic wave transmission period to a longer duration, and reducing the frequency of basis weight detection corresponds to setting the duration of the ultrasonic wave transmission period to a shorter duration. Thus, as a first application example of the second practical example, in a case where the variation in the basis weights is less than a threshold, the switching control unit 364 may set the duration of the ultrasonic wave transmission period to a predetermined duration, and in a case where the variation in the basis weights is greater than the threshold, the switching control unit 364 may set the duration of the ultrasonic wave transmission period to a duration longer than the predetermined duration.

Also, as a second application example of the second practical example, the switching control unit 364 may be capable of changing the ratio of the duration of the basis weight detection period to the duration of the operation sound detection period in the time period in which one sheet of recording material P passes the detection position 329 between the transmission unit 31 and the reception unit 71. In other words, in a case where the variation in the basis weights is less than a threshold, the switching control unit 364 may set the ratio of the basis weight detection period to a predetermined value, and in a case where the variation in the basis weights is greater than the threshold, the switching control unit 364 may set the ratio to a value greater than the predetermined value. For example, in a case where the variation in the basis weights is greater than the threshold, the ratio may be set to a value greater than 1 so that the duration of the basis weight detection period is longer than the duration of the operation sound detection period.

(3) Third Practical Example

First, in step S1601, the operation monitoring unit 363 monitors user operation on the cassette 2 on the basis of a sensor signal from the cassette sensor 91. In a case where the operation monitoring unit 363 detects that a user operation has been performed on the cassette 2, in step S1603, user operation history is stored in the memory. Also, in step S1605, the control unit 360 determines whether to start an image forming operation. For example, in a case where a print job is received from an external host computer, the control unit 360 determines to start an image forming operation, and the process proceeds to step S1607.

In step S1607, the control unit 360 starts an image forming operation. Next, in step S1609, the switching control unit 364 determines whether an operation history of the cassette 2 recorded by the operation monitoring unit 363 exists. In a case where cassette 2 operation history exists, the switching control unit 364 starts the switching control of the detection mode between the basis weight detection mode and the operation sound detection mode using a control pattern (for example, the first control pattern described above) that has a higher frequency of basis weight detection. Next, the switching control unit 364 deletes the record of the cassette 2 operation history. On the other hand, in a case where cassette 2 operation history does not exist, the switching control unit 364 maintains the control pattern used in the operation up until this point. Next, in step S1617, the control unit 360 determines whether or not to finish the image forming operation. In a case of not finishing the image forming operation, in step S1619, the switching control unit 364 determines whether or not to change the control pattern in use according to a predetermined condition. Herein, the predetermined condition may be a condition based on the degree of degradation of the member, a condition based on the variation in the basis weight, or any other condition. In a case where the predetermined condition is satisfied, in step S1621, the switching control unit 364 changes the control pattern in use to another control pattern. Then, the process returns to step S1609. If no new user operation on the cassette 2 is detected, the control pattern changed to in step S1609 may be continued to be used.

Note that as described in relation to the first and the second practical examples, increasing the frequency of basis weight detection corresponds to setting the duration of the ultrasonic wave transmission period to a longer duration, and reducing the frequency of basis weight detection corresponds to setting the duration of the ultrasonic wave transmission period to a shorter duration. Thus, as a first application example of the third practical example, in a case where a user operation on the cassette 2 has not been detected, the switching control unit 364 sets the duration of the ultrasonic wave transmission period to a predetermined duration. Then, in a case where a user operation on the cassette 2 has been detected, the switching control unit 364 may set the duration of the ultrasonic wave transmission period to a duration longer than the predetermined duration. After the basis weight is detected in the ultrasonic wave transmission period set to the longer duration in response to a user operation, the switching control unit 364 may reconfigure the duration of the ultrasonic wave transmission period to the predetermined duration.

Also, as a second application example of the third practical example, the switching control unit 364 may be capable of changing the ratio of the duration of the basis weight detection period to the duration of the operation sound detection period in the time period in which one sheet of recording material P passes the detection position 329 between the transmission unit 31 and the reception unit 71. In other words, in a case where a user operation on the cassette 2 has not been detected, the switching control unit 364 may set the ratio of the basis weight detection period to a predetermined value, and in a case where a user operation on the cassette 2 has been detected, the switching control unit 364 may set the ratio to a value greater than the predetermined value. For example, in a case where a user operation on the cassette 2 has been detected, the ratio may be set to a value greater than 1 so that the duration of the basis weight detection period is longer than the duration of the operation sound detection period. After the basis weight is detected with the ratio of the ultrasonic wave transmission period set to the greater value in response to a user operation, the switching control unit 364 may reconfigure the duration of the ultrasonic wave transmission period to the predetermined value.

4. Modified Example

The foregoing has been a description of main examples in which the detection mode is switched using patterns from among a plurality of control patterns designed in advance. However, the control pattern may be dynamically or adaptively set. For example, in a first modified example, in a case where a member (for example, a feeding-related member) in which an operation sound arises only at a certain time is the target of abnormality diagnosis, the control unit 360 may preferentially set the mode to the operation sound detection mode in the time period including this time. In this case, the control unit 360 may set the mode to the basis weight detection mode or the operation sound detection mode for the remaining time period. In a second modified example, in a case where there is a possibility that an operation sound may be caused by the member that is the target of abnormality diagnosis at any time, the control unit 360 may preferentially set the mode to the basis weight detection mode in a time period suitable for basis weight detection. In this case, the control unit 360 may set the mode to the basis weight detection mode or the operation sound detection mode for the remaining time period. The operation sound detection mode may be set only in a case where a detection time (for example, 200 ms) of a sufficient duration can be secured. In any of the modified examples, in a case where the predetermined condition described above is satisfied, the control unit 360 may change the control pattern in use at that time to another control pattern.

The examples described above have been examples in which the state of the image forming unit 1 is diagnosed on the basis of the operation sound detected by the diagnosis unit 350 of the image forming apparatus 100. However, diagnosis based on operation sound may be performed by another device that receives data relating to the operation sound from the image forming apparatus 100 instead of by the image forming apparatus 100. Also, a man-made diagnosis by a user or serviceman may be made possible by the image forming apparatus 100 or another device reproducing the operation sound or presenting data relating to the operation sound.

5. Supplement

Embodiments of the present disclosure has been described above in detail using FIGS. 1 to 16B. In the embodiments described above, the image forming apparatus includes a first detection unit configured to detect an operation sound on the basis of a sound wave and a second detection unit configured to detect basis weight of recording material on the basis of an ultrasonic wave, with the reception unit that receives the sound wave or the ultrasonic wave being shared by the first detection unit and the second detection unit. The image forming apparatus further includes a switching unit configured to switch an output destination of a reception signal from the reception unit between a first path to the first detection unit and a second path to the second detection unit; and with a certain control pattern, the switching unit outputs a reception signal from the reception unit to the first path at a first timing and outputs the reception signal from the reception unit to the second path at a second timing different to the first timing. In a case where a predetermined condition is satisfied, the control pattern is changed, and the switching unit outputs the reception signal from the reception unit to the second path at the first timing or outputs the reception signal from the reception unit to the first path at the second timing. According to this configuration, the timing used by the reception unit for the first detection unit to detect the operation sound and the timing used by the reception unit for the second detection unit to detect the basis weight do not overlap. Accordingly, the reception unit can be shared, and thus avoiding increase in the size of the device, increase in the number of parts, and increase in the cost, while the operation sound and the basis weight can be appropriately detected. Further, the control pattern of the switching control of the detection mode is changed in a case where the predetermined condition is satisfied, which makes it possible to optimize frequencies of operation sound detection and basis weight detection depending on changes over time in the state of the image forming apparatus.

In a practical example, the predetermined condition may include a first condition being that a degree of degradation of a member, which causes an abnormal sound when the member has degraded, has reached a predetermined level. By the frequency of basis weight detection being maintained at a relatively high value until the first condition is satisfied, the basis weight can be swiftly confirmed, and an operation condition suited to the type of recording material can be set, for example. Also, by increasing the frequency of operation sound detection in a case where the first condition is satisfied, it will be possible at the end of the durability period of the member to reliably find an abnormality arisen in the device or to find a symptom of an abnormality in an early stage, allowing necessary measures to be taken.

In a practical example, the predetermined condition may include the second condition based on a comparison of variation in basis weights detected by the second detection unit and a threshold. For example, in a case where the variation in the basis weights is less than the threshold, the accuracy of basis weight detection may be considered not to fall below a certain level even when the frequency of basis weight detection being lowered. Thus, it is beneficial in this case to increase the frequency of operation sound detection so as to reliably find an abnormality arisen or a symptom of an abnormality arising. Conversely, in a case where the variation in the basis weights is greater than the threshold, the accuracy of basis weight detection can be maintained to a certain level by increasing the frequency of basis weight detection.

In a practical example, the predetermined condition may include the third condition being that a user operation on the retaining unit retaining recording material prior to conveyance has been detected. In a case where the third condition is not satisfied, the type of the recording material retained by the retaining unit may be considered not to have been changed. Thus, by reusing the basis weight detection result from the previous time, the frequency of basis weight detection can be maintained at a relatively low level. Then, in a case where the third condition is satisfied, the basis weight can be swiftly confirmed by increasing the frequency of basis weight detection, and the type of recording material that may have been changed to can be determined in an early stage.

Also, in the embodiments described above, the image forming apparatus further includes a setting unit configured to set an operation condition of an image forming operation for the image forming apparatus on the basis of the basis weight detected by the second detection unit. In this case, an operation condition suited to the type of recording material in use can be automatically set on the basis of the basis weight detected at an appropriate maintained frequency.

Also, in the embodiments described above, the image forming apparatus is further provided with an abnormality diagnosis unit configured to determine if an abnormality has arisen or if there is a symptom of an abnormality arising in the image forming apparatus on the basis of the operation sound detected by the first detection unit. In this case, in the time period for abnormality diagnosis efficiently secured, the image forming apparatus can recognize that an abnormality has arisen or that there is a symptom of an abnormality arising and can swiftly perform notification to a user.

Note that the change in the control pattern described above can be considered to mean a change in the detection period for detecting basis weight. In other words, in a case where a control pattern is active, the transmission unit is controlled to transmit an ultrasonic wave in the detection period corresponding to at least a portion of the time period in which the recording material passes a section between the transmission unit that transmits an ultrasonic wave and the reception unit. In this detection period, the second detection unit detects the basis weight of the recording material on the basis of a signal relating to the ultrasonic wave. The control pattern is changed to another control pattern in a case where a predetermined condition is satisfied. In response to this, the duration of the detection period may be change to a longer time period or a shorter time period. As a result, a basis weight can be detected by the second detection unit at a time when an operation sound would be detected by the first detection unit, or an operation sound can be detected by the first detection unit at a time when a basis weight would be detected by the second detection unit.

6. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. An image forming apparatus configured to form an image on a recording material, comprising:
   a transmission unit configured to transmit an ultrasonic wave toward a conveyance path along which the recording material is conveyed;
   a reception unit configured to receive a sound wave arisen in the image forming apparatus and the ultrasonic wave transmitted by the transmission unit; and
   a control unit configured to switch from a first operation to a second operation after a predetermined number of sheets are conveyed so that the first operation is performed on the predetermined number of sheets and the second operation is performed on a following sheet to be conveyed after the predetermined number of sheets are conveyed,
   wherein the first operation is to detect basis weight of the recording material based on the ultrasonic wave received by the reception unit, and
   the second operation is to acquire information of the sound wave received by the reception unit.

2. The image forming apparatus according to claim 1, wherein
   the control unit is configured to monitor a degree of degradation of a member that causes an abnormal sound when the member has degraded, and
   the control unit is configured to switch from the first operation to the second operation when a predetermined condition is satisfied, the predetermined condition being that the degree of degradation has reached a predetermined level.

3. The image forming apparatus according to claim 1, further comprising
   a setting unit configured to set an operation condition of an image forming operation in the image forming apparatus on the basis of the detected basis weight.

4. The image forming apparatus according to claim 3, wherein the operation condition includes one or more of: conveyance speed of the recording material, application bias for toner transfer on the recording material, and heating temperature for fixing toner on the recording material.

5. The image forming apparatus according to claim 1, further comprising
   an abnormality diagnosis unit configured to determine if an abnormality has arisen or if there is a symptom of an abnormality arising in the image forming apparatus on the basis of the information of the sound wave.

6. The image forming apparatus according to claim 5, further comprising
   a display unit configured to, in a case where the abnormality diagnosis unit has determined that the abnormality has arisen or that there is a symptom of the abnormality arising, display information indicating a result of the determination.

7. The image forming apparatus according to claim 5, further comprising
   a communication interface configured to, in a case where the abnormality diagnosis unit has determined that the abnormality has arisen or that there is a symptom of the abnormality arising, transmit information indicating a result of the determination to another device.

* * * * *